US012670396B2

(12) United States Patent
Ishikawa et al.

(10) Patent No.: US 12,670,396 B2
(45) Date of Patent: Jun. 30, 2026

(54) LEARNING PROCESSING DEVICE AND LEARNING PROCESSING METHOD

(71) Applicant: Hitachi High-Tech Corporation, Tokyo (JP)

(72) Inventors: Masayoshi Ishikawa, Tokyo (JP); Masanori Ouchi, Tokyo (JP); Hiroyuki Shindo, Tokyo (JP); Yasutaka Toyoda, Tokyo (JP); Shinichi Shinoda, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 954 days.

(21) Appl. No.: 17/791,967

(22) PCT Filed: Feb. 7, 2020

(86) PCT No.: PCT/JP2020/004878
§ 371 (c)(1),
(2) Date: Jul. 11, 2022

(87) PCT Pub. No.: WO2021/157067
PCT Pub. Date: Aug. 12, 2021

(65) Prior Publication Data
US 2023/0004811 A1 Jan. 5, 2023

(51) Int. Cl.
*G06N 3/082* (2023.01)
(52) U.S. Cl.
CPC .................................... *G06N 3/082* (2013.01)
(58) Field of Classification Search
CPC .................................................... G06N 3/082
(Continued)

(56) References Cited

U.S. PATENT DOCUMENTS

2015/0006444 A1 1/2015 Tamatsu et al.
2018/0114114 A1 4/2018 Molchanov et al.
(Continued)

FOREIGN PATENT DOCUMENTS

CN 107368891 W 11/2017
CN 107977703 A 5/2018
(Continued)

OTHER PUBLICATIONS

Lee, et al., "Structure Level Adaptation for Artificial Neural Networks", Springer Science + Business Media LLC, 1991 (Year: 1991).*
Song Han et al., "DSD: Dense-Sparse-Dense Training for Deep Neural Networks", arXiv.org[online], 2017, arXiv:1607.04381v2, pp. 1-13.
(Continued)

*Primary Examiner* — Tsu-Chang Lee
(74) *Attorney, Agent, or Firm* — MATTINGLY & MALUR, PC

(57) ABSTRACT
A learning processing device and method achieves learning of a lightweight model that is completed in a short amount of time. The learning processing device obtains a new, second learning model from an existing first learning model. An input unit acquires a first learning model generated in advance by learning a first learning data set, and an unpruned neural network (hereinafter, NN). An important parameter identification unit uses the first learning model and the NN to initialize a NN to be learned, and uses a second learning data set and the initialized NN to identify a degree of importance of parameters in a recognition process of the initialized NN. A new model generation unit carries out a pruning process for deleting parameters which are not important from the initialized NN, thereby generating a second NN; and a learning unit uses the second learning data set to learn the second NN.

8 Claims, 13 Drawing Sheets

(58)   Field of Classification Search
USPC ............................................................ 706/16
See application file for complete search history.

(56)                      References Cited

U.S. PATENT DOCUMENTS

| | | | |
|---|---|---|---|
| 2019/0095795 A1* | 3/2019 | Ren ....................... G06T 3/4053 | |
| 2019/0251444 A1 | 8/2019 | Alakuijala et al. | |
| 2019/0286945 A1 | 9/2019 | Kamath et al. | |
| 2019/0378017 A1 | 12/2019 | Kung | |

FOREIGN PATENT DOCUMENTS

| | | | |
|---|---|---|---|
| CN | 109993302 W | 7/2019 | |
| JP | 2015-011510 A | 1/2015 | |

OTHER PUBLICATIONS

Eric Jang., "Categorical Reparameterization With Gumbel-Softmas", arXiv.org[online], 2017, arXive:1611.01144v5, pp. 1-13.
International Search Report of PCT/JP2020/004878 dated Apr. 14, 2020.
Office Action dated Feb. 16, 2022 issued in corresponding to Taiwanese Patent Application No. 110101040.
Korean Office Action received in corresponding Korean Application No. 10-2022-7024814 dated Apr. 29, 2025.
Lee, J. et al., "Adaptive Network Sparsification with Dependent Variational Beta-Bernoulli Dropout", Mar. 4, 2019, pp. 1-13.
Chinese Office Action received in corresponding Chinese Application No. 202080093955.X dated Feb. 28, 2025.

* cited by examiner

| # | TYPE OF PRE-TRAINED MODEL | PRE-TRAINED DATA SET | SUM OF DEGREES OF IMPORTANCE | POST-PRUNING SUM OF DEGREES OF-IMPORTANCE |
|---|---|---|---|---|
| 1 | Model 1 | YYYYMMDD-Contour | 99 | 80 |
| 2 | Model 2 | YYYYMMDD-Contour | 78 | 63 |
| 3 | Model 1 | YYYYMMDD-Inspection | 60 | 20 |
| ... | ... | ... | ... | ... |

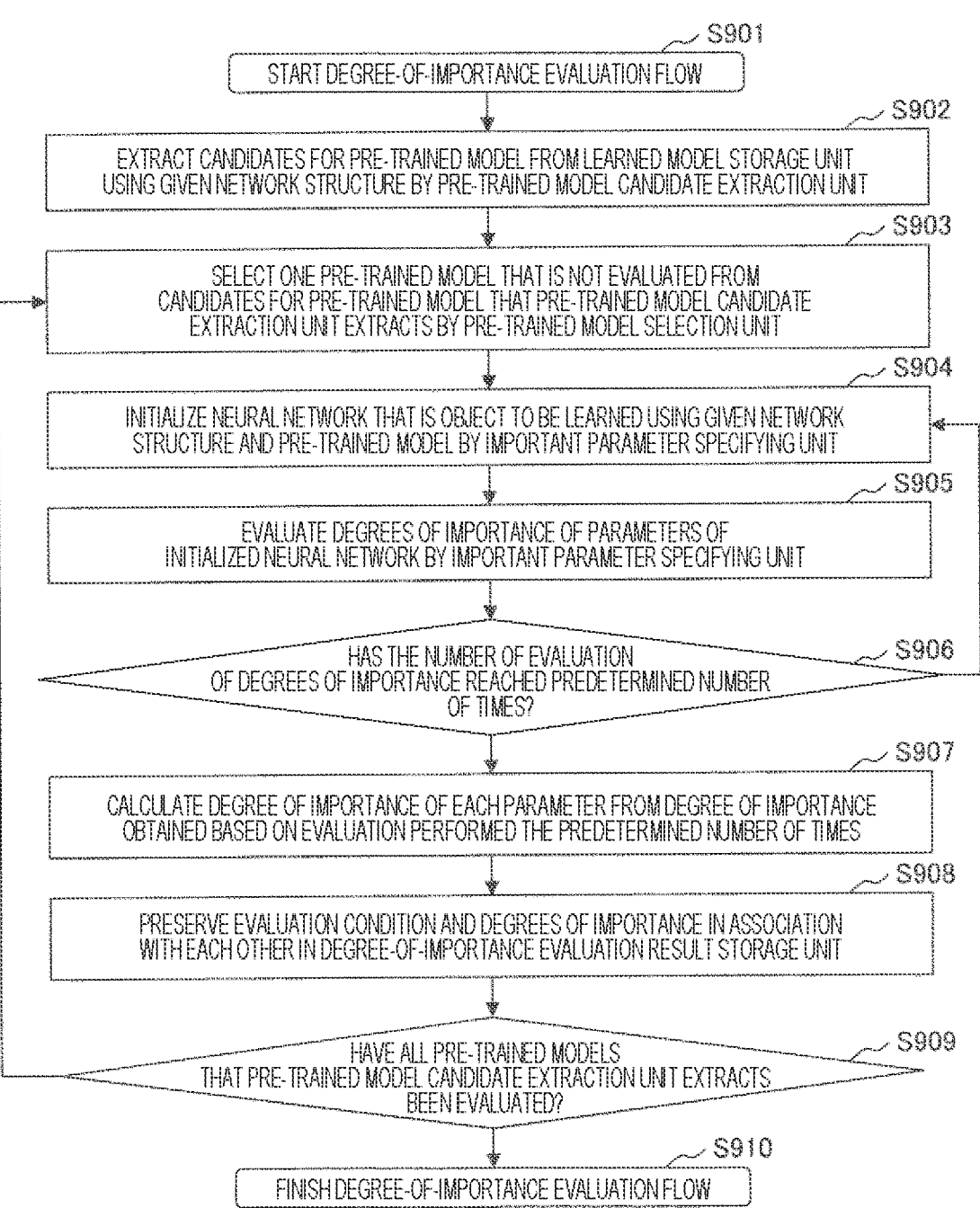

S901
START DEGREE-OF-IMPORTANCE EVALUATION FLOW

S902
EXTRACT CANDIDATES FOR PRE-TRAINED MODEL FROM LEARNED MODEL STORAGE UNIT
USING GIVEN NETWORK STRUCTURE BY PRE-TRAINED MODEL CANDIDATE EXTRACTION UNIT

S903
SELECT ONE PRE-TRAINED MODEL THAT IS NOT EVALUATED FROM
CANDIDATES FOR PRE-TRAINED MODEL THAT PRE-TRAINED MODEL CANDIDATE
EXTRACTION UNIT EXTRACTS BY PRE-TRAINED MODEL SELECTION UNIT

S904
INITIALIZE NEURAL NETWORK THAT IS OBJECT TO BE LEARNED USING GIVEN NETWORK
STRUCTURE AND PRE-TRAINED MODEL BY IMPORTANT PARAMETER SPECIFYING UNIT

S905
EVALUATE DEGREES OF IMPORTANCE OF PARAMETERS OF
INITIALIZED NEURAL NETWORK BY IMPORTANT PARAMETER SPECIFYING UNIT

S906
HAS THE NUMBER OF EVALUATION
OF DEGREES OF IMPORTANCE REACHED PREDETERMINED NUMBER
OF TIMES?

S907
CALCULATE DEGREE OF IMPORTANCE OF EACH PARAMETER FROM DEGREE OF IMPORTANCE
OBTAINED BASED ON EVALUATION PERFORMED THE PREDETERMINED NUMBER OF TIMES

S908
PRESERVE EVALUATION CONDITION AND DEGREES OF IMPORTANCE IN ASSOCIATION
WITH EACH OTHER IN DEGREE-OF-IMPORTANCE EVALUATION RESULT STORAGE UNIT

S909
HAVE ALL PRE-TRAINED MODELS
THAT PRE-TRAINED MODEL CANDIDATE EXTRACTION UNIT EXTRACTS
BEEN EVALUATED?

S910
FINISH DEGREE-OF-IMPORTANCE EVALUATION FLOW

FIG. 13

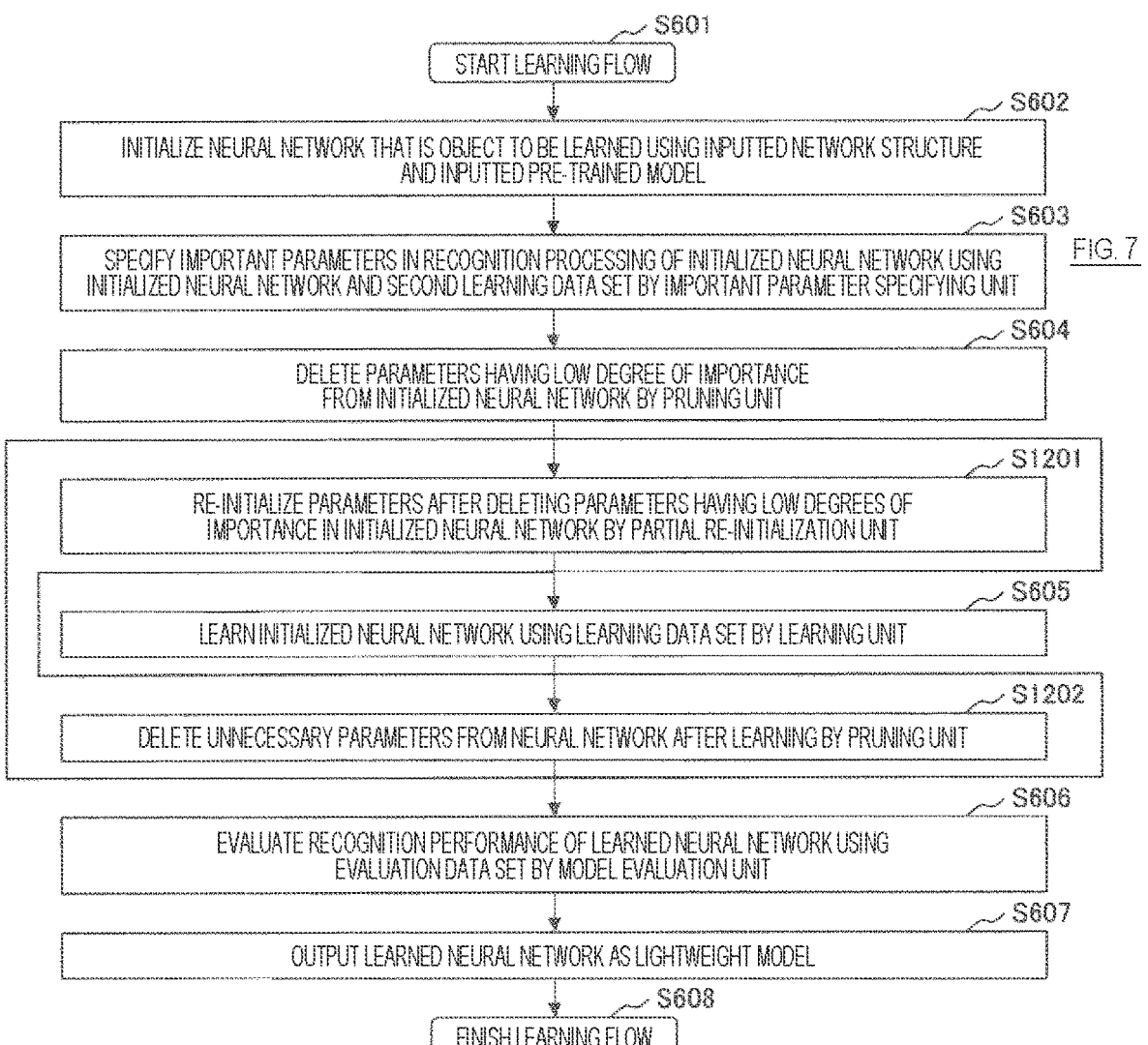

S601
START LEARNING FLOW

S602
INITIALIZE NEURAL NETWORK THAT IS OBJECT TO BE LEARNED USING INPUTTED NETWORK STRUCTURE
AND INPUTTED PRE-TRAINED MODEL

S603
SPECIFY IMPORTANT PARAMETERS IN RECOGNITION PROCESSING OF INITIALIZED NEURAL NETWORK USING
INITIALIZED NEURAL NETWORK AND SECOND LEARNING DATA SET BY IMPORTANT PARAMETER SPECIFYING UNIT     FIG. 7

S604
DELETE PARAMETERS HAVING LOW DEGREE OF IMPORTANCE
FROM INITIALIZED NEURAL NETWORK BY PRUNING UNIT

S1201
RE-INITIALIZE PARAMETERS AFTER DELETING PARAMETERS HAVING LOW DEGREES OF
IMPORTANCE IN INITIALIZED NEURAL NETWORK BY PARTIAL RE-INITIALIZATION UNIT

S605
LEARN INITIALIZED NEURAL NETWORK USING LEARNING DATA SET BY LEARNING UNIT

S1202
DELETE UNNECESSARY PARAMETERS FROM NEURAL NETWORK AFTER LEARNING BY PRUNING UNIT

S606
EVALUATE RECOGNITION PERFORMANCE OF LEARNED NEURAL NETWORK USING
EVALUATION DATA SET BY MODEL EVALUATION UNIT

S607
OUTPUT LEARNED NEURAL NETWORK AS LIGHTWEIGHT MODEL

S608
FINISH LEARNING FLOW

| CHANNEL NUMBER | 1 | 2 | 3 | 4 | |
|---|---|---|---|---|---|
| CONVOLUTION LAYER a | 1 | 0 | 0 | 1 | 1405-a |
| CONVOLUTION LAYER b | 1 | 1 | 0 | 0 | 1405-b |
| CONVOLUTION LAYER c | 0 | 1 | 0 | 1 | 1405-c |
| CONVOLUTION LAYER d | 1 | 0 | 0 | 0 | 1405-d |
| LOGICAL SUM | 1 | 1 | 0 | 1 | 1406 |

1404

LEARNING PROCESSING DEVICE AND LEARNING PROCESSING METHOD

TECHNICAL FIELD

The present invention relates to a learning processing device and a learning processing method using a neural network.

BACKGROUND ART

In the field of signal processing including image processing, natural language processing, and speech recognition, there may be a case where recognition processing is performed using a learning processing device that uses a multilayer neural network. In recent years, a neural network has a large number of parameters to improve recognition performance and hence, the neural network requires an enormous amount of arithmetic operation. However, data including a large amount of images or the like is to be processed in recognition processing that is performed after learning. Accordingly, it is desirable to perform processing with a small number of parameters and a small amount of arithmetic operation. In the present invention, a neural network that can be processed with a small number of parameters and a small amount of arithmetic operation is referred to as a lightweight model.

As a technique for reducing the number of parameters and an amount of arithmetic operation of a multilayer neural network after learning, there has been known pruning. The pruning is a technique where unnecessary parameters and unnecessary arithmetic operation in the neural network after learning are identified, and are deleted. With such pruning, the number of parameters and an amount of arithmetic operation required for recognition processing of the neural network can be reduced.

For example, in PTL 1, studies have been made on a system where units in a neural network after learning are randomly deleted, a cost function is evaluated after relearning, and a structure having the best cost function is outputted as an optimal structure of the neural network.

CITATION LIST

Patent Literature

PTL 1: Japanese Patent Application Laid-Open No. 2015-11510

SUMMARY OF INVENTION

Technical Problem

In general, the weight reduction of a neural network by pruning requires a long learning period. This is because parameters have to be deleted little by little in order to minimize an adverse influence on the recognition accuracy in performing the reduction of weight of the neural network. When a large number of parameters are deleted at a time, the recognition accuracy is largely deteriorated. Accordingly, a lightweight model with small deterioration of recognition accuracy is usually learned where the deletion of a small number of parameters and the relearning are repeated a plurality of times.

Therefore, the learning of the lightweight neural network requires to be performed the number of times that is several times as large as the number of times of the learning of the normal neural network. Accordingly, the learning of the lightweight neural network requires a long learning period. In particular, in a case where the number of types of recognition processing to be performed is large or in a case where models of a neural network used in an environment where the processing is performed is to be switched, it is necessary to prepare a plurality of lightweight models. Accordingly, a learning period becomes long and this becomes a factor that causes a delay in development and updating of a recognition processing function.

In view of the above, there has been a demand for a configuration that enables the learning of a lightweight model to be finished within a short period of time. PTL 1, however, has not studied shortening of a period for learning a lightweight model.

Solution to Problem

In view of such circumstances, according to the present invention, there is provided a learning processing device for obtaining a new second learning model from an existing first learning model, the learning processing device including:

an input unit that acquires a first learning model generated in advance by learning a first learning data set, and an unpruned neural network; an important parameter identification unit that initializes the neural network that is an object to be learned by using the first learning model and the neural network, and identifies degrees of importance of parameters in recognition processing of the initialized neural network by using a second learning data set and the initialized neural network; a new model generating unit that generates a second neural network by performing pruning processing for pruning unimportant parameters from the initialized neural network using the degrees of importance of the parameters; a learning unit that learns the second neural network by using the second learning data set; and an output unit that outputs the second neural network after learning as a second learning model.

Further, according to the present invention, there is provided a learning processing method for obtaining a new second learning model from an existing first learning model, the learning processing method including: acquiring a first learning model generated in advance by learning a first learning data set, and an unpruned neural network; initializing the neural network that is an object to be learned using the first learning model and the neural network; identifying degrees of importance of parameters in recognition processing of the initialized neural network by using a second learning data set and the initialized neural network; generating a second neural network by performing pruning processing for pruning unimportant parameters from the initialized neural network using the degrees of importance of the parameters; learning the second neural network using the second learning data set; and setting the second neural network after learning as a second learning model.

Further, in the present invention, there is provided a learning processing method for obtaining a new second learning model from an existing first learning model, the learning processing method including: initializing an unpruned neural network that is an object to be learned by using the unpruned neural network and the first learning model; obtaining a degrees of importance of a parameter in recognition processing of the initialized neural network by using a second learning data set and the initialized neural network; performing pruning processing according to the degrees of importance; and obtaining a second learning model by learning of the neural network after pruning by using the second learning data set.

Advantageous Effects of Invention

According to the present invention, even in a case where the number of types of recognition processing to be executed is large or even in a case where a model of a neural network to be used is switched depending on an environment where the processing is performed, it is possible to shorten the time required for learning a lightweight model, and it is also possible to provide a rapid recognition processing function.

BRIEF DESCRIPTION OF DRAWINGS

FIG. 10 is a flowchart illustrating an example of a processing flow of a learning processing method according to the embodiment 2 of the present invention.

FIG. 13 is a flowchart illustrating an example of a processing flow of a learning processing method according to the embodiment 2 of the present invention.

DESCRIPTION OF EMBODIMENTS

Hereinafter, embodiments of the present invention will be described with reference to the drawings.

Embodiment 1

Figure 1:
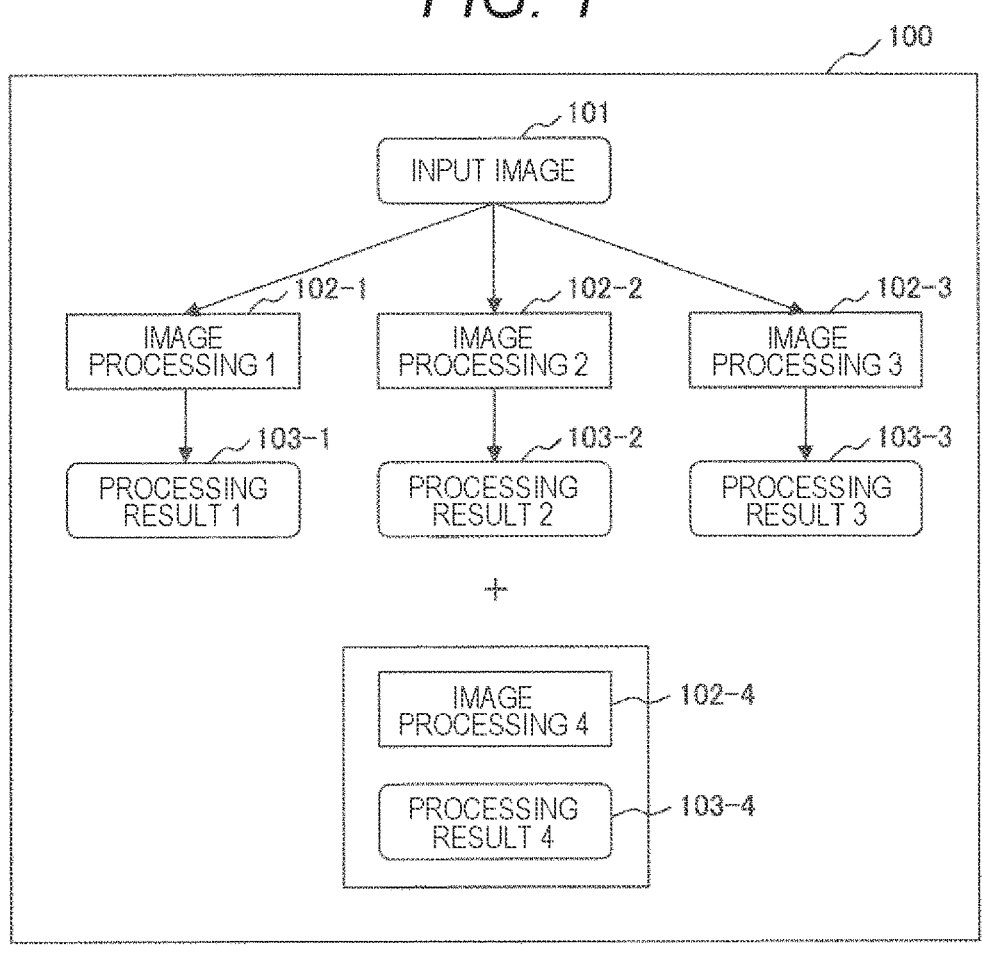
FIG. 1 is a diagram illustrating an example of a use mode of a neural network that is assumed in a learning processing device of the present invention.
Figure 2:
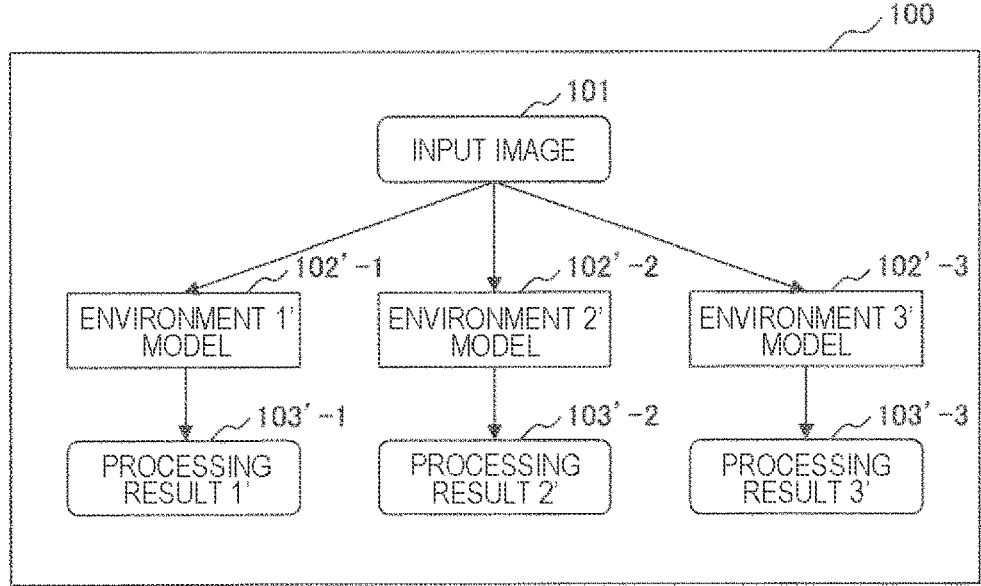
FIG. 2 is a diagram illustrating an example of a use mode of a neural network that is assumed in a learning processing device of the present invention.

FIG. 1 and FIG. 2 are diagrams illustrating examples of a use mode of a neural network that is assumed in a learning processing device of the present invention. In these cases, a case is exemplified where a learning processing device 100 performs image processing. However, processing to which the learning processing device 100 is applicable includes natural language processing, speech recognition, and other signal processing.

In the case illustrated in FIG. 1, in the learning processing device 100, an input image 101 is inputted to a plurality of image processing units 102 (102-1, 102-2, 102-3), and each image processing unit 102 performs recognition processing on the input image 101.

The processing in the image processing unit 102 is image processing such as image classification, object detection, semantic segmentation, and captioning, and the image processing units 102-1, 102-2, 102-3 perform respectively different recognition processing. For example, in an example of an image inspection of a product, the image processing unit 102-1 performs image processing 1 for classifying the quality of the product into a non-defective product and a defective product with respect to a given image. The image processing unit 102-2 performs image processing 2 for detecting a foreign substance mixed in the product. The image processing unit 102-3 performs image processing 3 for performing segmentation by which the shape of the product is recognized. As a result, the processing result units 103 (103-1, 103-2, 103-3) acquire the processing results with respect to respective parts of the product.

The image processing units 102-1, 102-2, 102-3 are each a learning model including a neural network having a configuration specialized for each recognition processing. As described above, in a case where a plurality of image processing are applied to one input image 101 and different neural networks are used for respective image processing or the like, it is necessary to learn a lightweight model with respect to the plurality of neural networks.

In the learning processing device 100 according to the present invention having the configuration illustrated in FIG. 1, it is assumed that an image processing unit 102-4 (lightweight model) that obtains an image processing result 4 added when a new inspection item occurs, and a processing result unit 103-4 are newly added.

In addition, there is a case where it is necessary to learn a plurality of lightweight models even in the same recognition processing. FIG. 2 illustrates a case where respective learning models in the image processing units 102-1, 102-2, 102-3 in FIG. 1 are set to learning models that are optimized in response to, for example, a change in environment in image measurement. Image processing units 102' (102'-1, 102'-2, 102'-3) each have the configuration that uses learning models (environment models) optimized in response to an environmental change. In the present invention, it is assumed that the environment model of FIG. 2 is newly added based on the configuration of FIG. 1.

For example, a learning model for executing processing in a case where an image is acquired via a lens having a different magnification differs from a learning model for executing processing using a lens having a normal magnification. In this case, it is necessary to construct a new neural network specialized for an image obtained via the lens having different magnification. Accordingly, it is necessary to newly obtain the configuration illustrated in FIG. 2.

As described above, the environmentally different models 102' (102-1, 102'-2, 102'-3) illustrated in FIG. 2 execute the same image processing as the learning models 102 (102-1, 102-2, 102-3) illustrated in FIG. 1. However, FIG. 2 illustrates the example where the model to be performed changes in response to the environment related to the input image 101. In this embodiment, the environment may be a place or a situation where the input image 101 is acquired, or a place or a situation where the recognition processing is performed. For example, in the case of outdoor image data, the model to be performed is changed depending on a situation such as daytime or nighttime. In the case of an image inspection system, the model to be performed is changed for respective types of objects to be inspected.

The processing result units 103' (103'-1, 103'-2, 103'-3) obtain outputs of execution from the environmentally different model 102' (102-1, 102'-2, 102'-3). The neural network to be performed in FIG. 2 differs from the neural network to be performed in FIG. 1 and hence, processing results 1', 2', and 3' output processing results different from the processing results acquired in FIG. 1.

Even when the environmentally different models 102' (102-1, 102'-2, 102'-3) are used in this manner, it is necessary to learn a plurality of lightweight models. In particular, in the case of an image inspection system, the number of combinations of the types of objects that are objects to be inspected and the number of combinations of the number of types of inspection processes are infinite. Accordingly, the number of combinations of the environmentally different models and the image processing becomes enormous. Therefore, the efficient acquisition of lightweight models is indispensable.

In the present embodiment, three examples are described with respect to both the image processing and the environmentally different models. However, one or more examples are sufficient.

Figure 3:
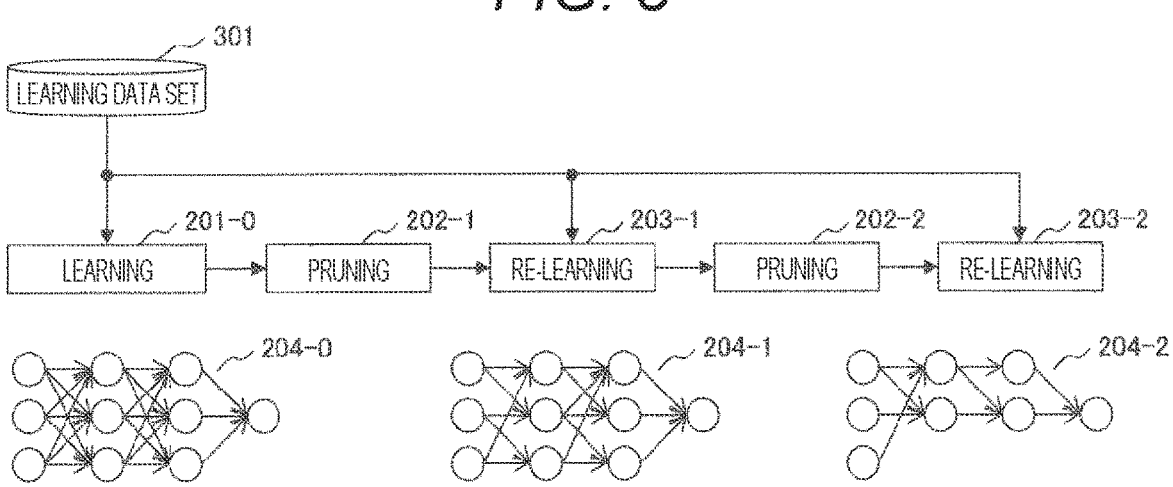
FIG. 3 is a diagram illustrating an outline of pruning by a conventional method.

As a method for learning and preparing a lightweight model, a pruning method is known. FIG. 3 is a view illustrating an outline of pruning by a conventional method. By performing the pruning, it is possible to reduce the weight of the learning model.

Normally, in performing the pruning, first, an unpruned neural network 204-0 is learned by learning processing 201-0 using a learning data set 301. Then, the pruning is performed in pruning processing 202-1. That is, unnecessary parameters in the unpruned neural network 204-0 after learning are identified, the unnecessary parameters are deleted, and a neural network 204-1 after pruning is outputted. In this embodiment, as parameters that are identified as unnecessary parameters by pruning, parameters having small absolute values or the like are selected.

There is a case where the recognition accuracy of the neural network 204-1 from which the parameters have been deleted by pruning is lower than the recognition accuracy of the neural network 204-0 to which pruning is not applied. In consideration of such a case, the parameters in the neural network 204-1 that are not pruned after the pruning are updated by relearning processing 203-1. As a result, the lowered recognition accuracy is recovered to a value close to the recognition accuracy of the neural network 204-0 to which pruning is not applied. Then, in a case where an amount of pruning is insufficient or in a case where a plurality of pruning processing are set, a neural network 204-2 that is further pruned is obtained by performing a pruning processing 202-2 and a relearning processing 203-2. The pruning processing and the relearning processing may be repeatedly applied twice or more. In the relearning processing 203-1 and 203-2, at the time of learning, learning is performed using the learning data set 301 having the same content as the learning data set used in the first learning processing 201-0.

As described above, in the pruning by the conventional method, unnecessary parameters are identified after the learning, and the relearning is repeatedly performed after the unnecessary parameters are deleted. This is because it is necessary to gradually delete the parameters so as not to adversely influence the recognition performance at the time of weight reduction by pruning. In the processing performed in accordance with these processes, the repetitive learning processing must be performed a plurality of times. Accordingly, the time required for learning the lightweight model becomes long. Accordingly, in particular, in a case where it is necessary to prepare a plurality of lightweight models as illustrated in FIG. 1 and FIG. 2, a preparation period becomes long. This causes a delay in offering a recognition function.

Figure 4:
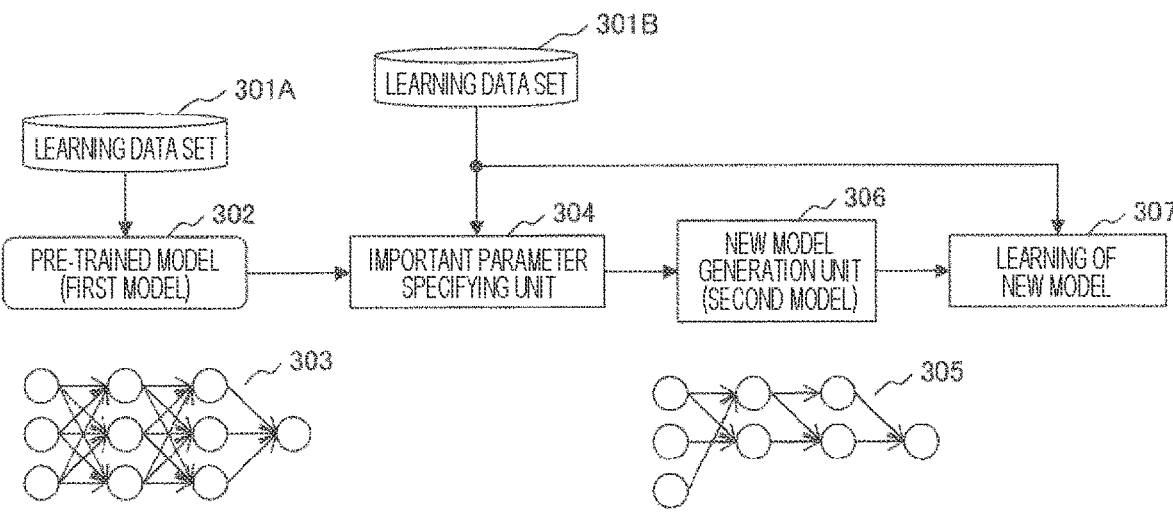
FIG. 4 is a diagram illustrating an outline of processing of the learning processing device according to the present invention.

FIG. 4 is a diagram illustrating an outline of processing of a learning processing device according to the present invention. In this processing, a second model (network) suitable for another processing is generated from a first model (network) prepared in advance. This relationship is expressed as follows, for example. That is, by using one model (network) of the image processing units 102 (102-1, 102-2, 102-3) in FIG. 1 as a first model, image processing unit 102-4 is newly generated as a second model. Alternatively, by using one model (network) of the image processing unit 102 (102-1, 102-2, 102-3) as a first model, an environment model 102' illustrated in FIG. 2 is newly generated as a second model.

Accordingly, the first model based on which the new model is generated is a pre-trained model 302 prepared in advance, and the pre-trained model 302 is generated using a first learning data set 301A that is an object to be learned specialized for the pre-trained model 302. In this drawing, reference numeral 303 denotes an unpruned neural network that is provided by an operator.

To an important parameter identification unit 304, a second learning data set 301B is applied. The second learning data set 301B is an object to be learned specialized for a second model to be newly generated with respect to the pre-trained model 302, which is the first model. With such processing, important parameters in the second learning data set 301B are identified by the pre-trained model 302, and only the important parameters are extracted. In this processing, identifying the important parameter means identifying parameters in the second model that are important for the recognition of the second learning data set 301B.

Then, in a new model generating unit 306, a neural network 305 is generated where only the parameters in the second model that are important for recognition of the second learning data set 301B are extracted from an unpruned neural network 303. By learning the neural network 305 by learning processing 307, it is possible to acquire a lightweight model in a short period of time. In this learning processing 307, the second learning data set 301B is used.

A method where pruning is not applied, that is, a method of performing learning using a model learned by a different data set (learning data set 301A) as an initial value is referred to as transfer learning. In the present invention, by applying the pruning at the time of such transfer, the learning processing 201-0 that has been necessary conventionally can be made unnecessary. Accordingly, the number of times of learning can be reduced and hence, a period for learning the lightweight model can be shortened.

In the present invention, the processing is basically performed in accordance with the processes as described above. However, there are some points to be devised for realizing the processing.

A first point to be devised or improved is that it has been difficult to apply pruning at the time of transfer learning in conventional methods. In general, in the learning processing 201-0 illustrated in FIG. 3, regularization that conforms with the pruning processing 202 is applied so as to reduce lowering of accuracy when the pruning processing 202 is performed. For example, in a case where the parameters having small absolute values are deleted in the pruning processing 202, the regularization that is referred to as Weight decay in which absolute values of parameters in a neural network become small is applied in the learning processing 201-0. A loss function of a neural network that includes Weight decay is expressed by Formula (1).

[Formula (1)]

$$L = Lr + \lambda \|\theta\|^2 \tag{1}$$

In the Formula (1), a first term on the right side that forms a loss function L of the neural network is a loss function Lr that is defined for each learning of recognition processing, and a second term is the term of Weight decay. λ is a coefficient of Weight decay, and θ is a parameter in the neural network. In order to delete more parameters, it is necessary to set a relatively large value as the coefficient λ of Weight decay.

However, when the coefficient λ of Weight decay is made large, many parameters take minute values. As a result, the recognition performance can be exhibited only with a learned data set, and the learning method is not suitable for transfer learning. In view of the above, it is desirable that the pre-trained model 302 be not a model in which strong Weiget decay is applied to the specific learning data set 302 but be a neural network in which many parameters have non-zero values.

In such a case, the important parameter identification unit 304 cannot identify the important parameters based on absolute values of the parameters.

In terms of improvement of this point, the following technique is preferably adopted in the embodiment of the present invention.

In FIG. 4, in general, in the pre-trained model 302 learned by the learning data set 301A that differs from the learning data set 301B, parameters that are effective for recognition of the learning data set 301B and parameters that are unnecessary for the recognition of the learning data set 301B exist. The important parameter identification unit 304 extracts parameters that are effective for recognition of the learning data set 301B by analyzing the Hessian. The Hessian is a quadratic derivative with respect to parameters of the loss function L. Accordingly, for example, the influence exerted on the loss function when each parameter is deleted can be calculated by a product of a square of the value of each parameter and a diagonal component of the Hessian.

The calculation Formula is expressed by a Formula (2). A subscript q indicates a value related to the qth parameter. H represents the Hessian, and a subscript qq represents a value in the qth row and the qth column. It is possible to extract only the parameters effective for recognition of the learning data set 301B from the pre-trained model 302 by deleting the parameters until this value becomes a desired pruning amount from a small value.

[Formula (2)]

$$dL = \theta_q^2 H_{qq} \tag{2}$$

As described above, in the present invention, the influence exerted on the behavior of the neural network when a certain parameter is deleted is evaluated, and this evaluation is set as a degree of importance of each parameter. The higher the degree of importance of the parameter, the lower the recognition performance of the neural network becomes when the parameter is deleted. Accordingly, by performing pruning from the parameters having the low degrees of importance, it is possible to suppress lowering of recognition performance of the neural network, and many parameters can be deleted.

The second point to be devised or improved in association with this point is as follows. That is, there may be a case where, in general, a multilayer neural network has a huge number of parameters and hence, it is difficult to directly calculate the Hessian.

In such a case, the influence exerted when each parameter is deleted may be calculated by the Fisher information matrix that is a second moment of a first derivative of the loss function L or Kronecker-Factored Approximated Curvature that is an approximation of the Fisher information matrix. Such influence may be calculated using a statistical quantity of a first derivative of the loss function L or a statistical quantity of a product of the first derivative and the parameter. In this case, for example, an absolute value of a product of an expected value of a gradient and a value of a parameter can be calculated as the influence exerted on the loss function when each parameter is deleted.

In the case of a convolutional neural network, the degrees of importance obtained in terms of a unit of parameter may be collected for each dimension that is referred to as a channel or a filter and may be used as the degree of importance for each channel or filter.

The degrees of importance of respective parameters may be evaluated using the relaxed Bernoulli distribution described in an embodiment 4.

Figure 5:
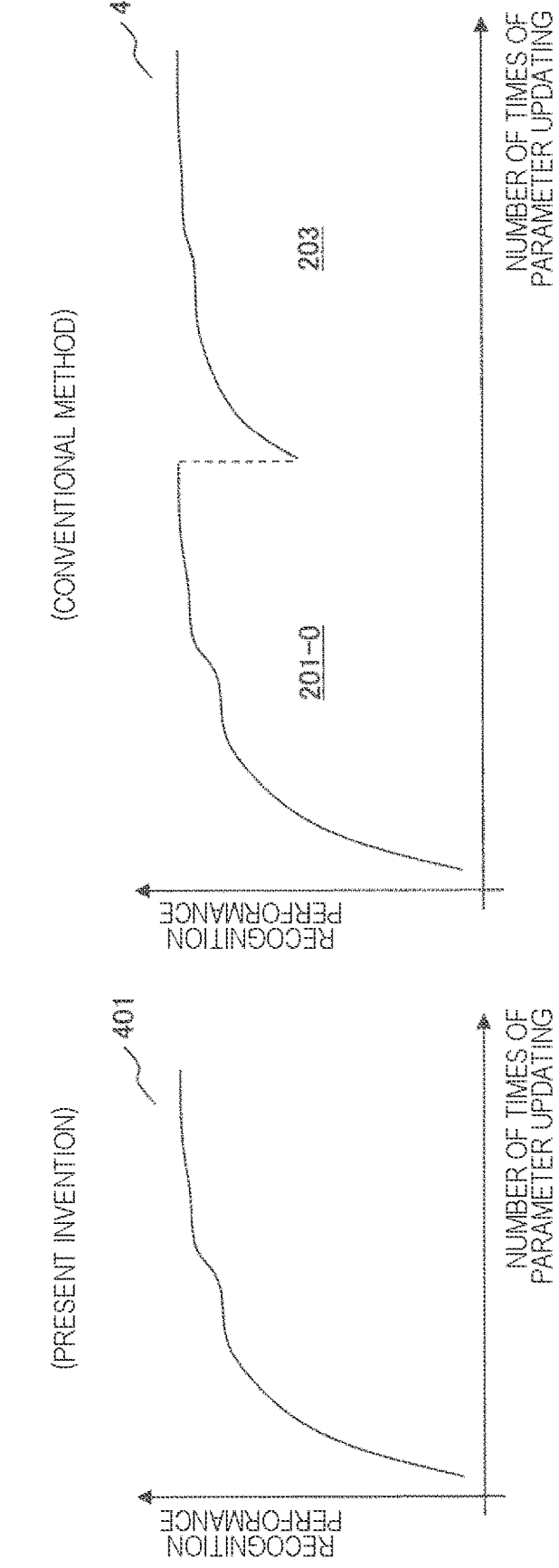
FIG. 5 is a diagram illustrating a comparison between an effect acquired by the present invention and an effect acquired by the conventional method.

FIG. 5 is a diagram illustrating a comparison between an effect acquired by the present invention and an effect acquired by a conventional method. In both a learning curve 401 according to the present invention and a learning curve 402 according to the conventional method, the number of times that parameters are updated at the time of learning is taken on an axis of abscissas, and the recognition performance is taken on an axis of ordinates.

According to the present invention, as illustrated on a left side of FIG. 5, as indicated by a learning curve 401, only one learning curve is drawn in order to identify only important parameters in the learning data set 301B from the pre-trained model 302 and to directly learn the lightweight model 306.

On the other hand, in the conventional method, the learning processing 201-0 and the relearning processing 203 that are performed one or more times are required and hence, as indicated by the learning curve 402, the learning curve is drawn two or more times. In FIG. 5, a broken line in the vicinity of the center of the learning curve 402 indicates the influence exerted on the lowering of accuracy by pruning. As described above, according to the present invention, a lightweight model can be acquired by learning performed one time and hence, the time required for acquiring one lightweight model can be significantly shortened.

Figure 6:
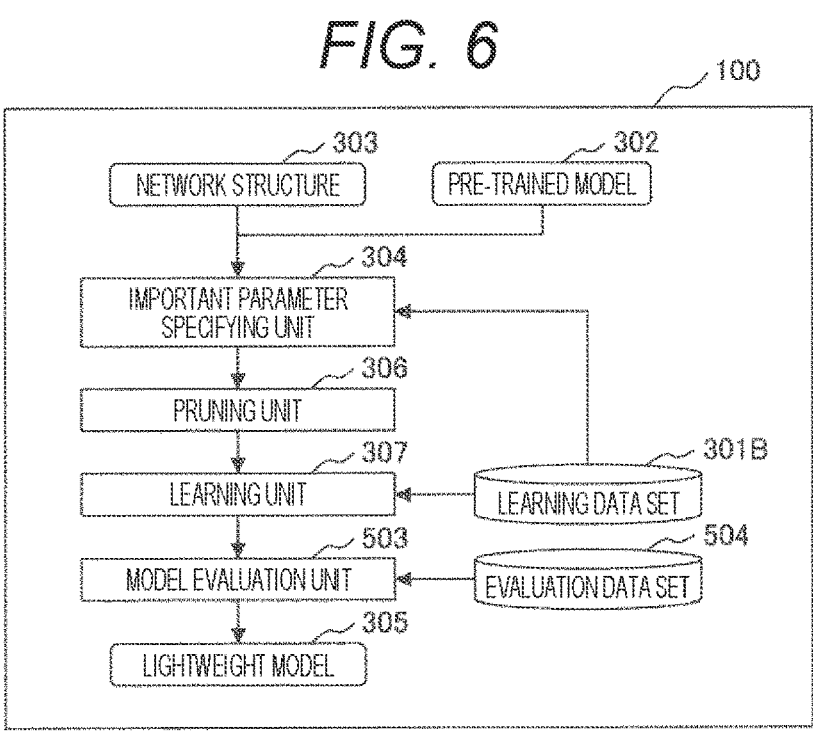
FIG. 6 is a diagram illustrating a functional configurational example of the learning processing device according to the present invention.
Figure 7:
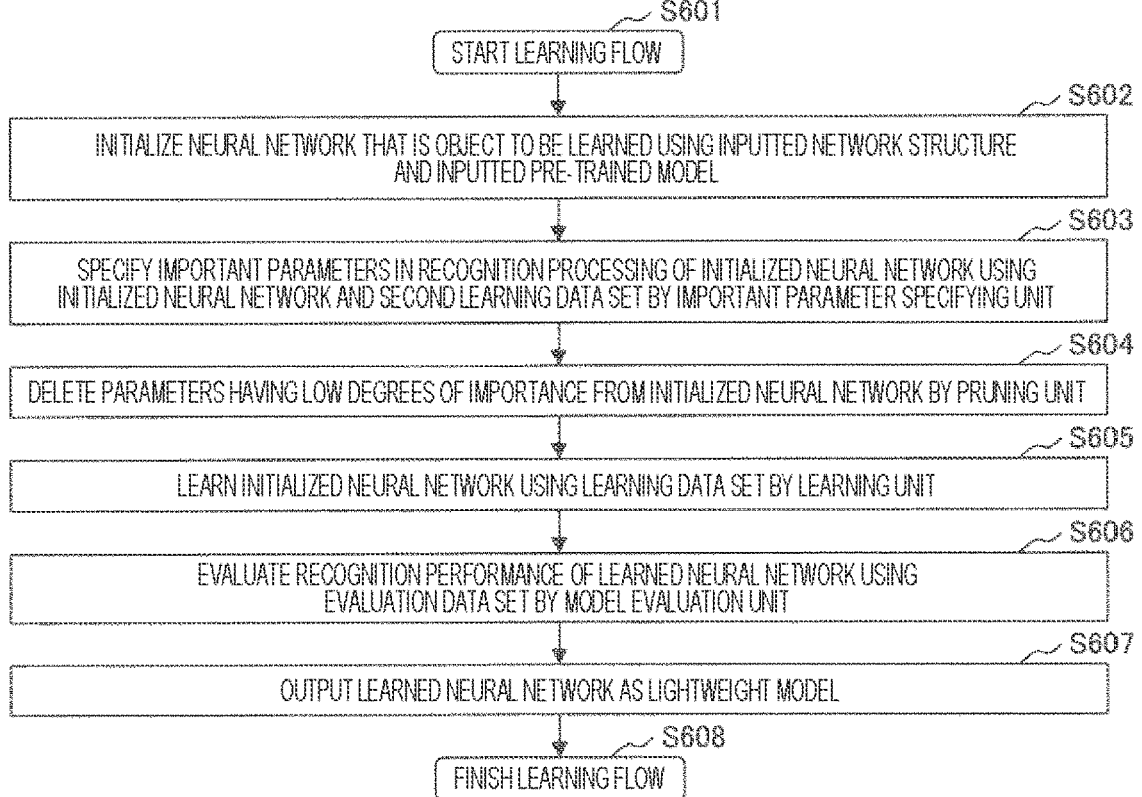
FIG. 7 is a flowchart illustrating an example of a processing flow of a learning processing method according to the present invention.

FIG. 6 illustrates a functional configuration example of the learning processing device of the present invention, and FIG. 7 illustrates an example of processing flow of the learning processing method of the present invention. In these drawings, the configuration and the flow until the lightweight model is learned using the learning data set 301 and the pre-trained model 302 are illustrated.

First, the functional configuration example diagram of the learning processing device of the present invention illustrated in FIG. 6 describes processing contents in an arithmetic operation unit when the processing of the present invention is realized by a computer as a main processing function. In this embodiment, the description is made with respect to a case where the pre-trained model 302 learned by the learning data set 301A and the unpruned neural network 303 are used.

In the important parameter identification unit 304, first, the neural network 303 that is an object to be learned is initialized by using the pre-trained model 302 and the unpruned neural network 303. By this initialization, the parameters in the pre-trained model 302 are reflected in the neural network 303 in a non-mowed form. Accordingly, it is safe to say that the neural network 303 after initialization is equivalent to the pre-trained model 302. In the important parameter identification unit 304, as next processing, parameters that are important in the recognition processing of the neural network 303 after initialization are identified using the neural network after initialization and the second learning data set 301B that is an object to be learned identified for the second model 305 to be newly generated.

A pruning unit 306 is a processing unit that performs processing corresponds to the processing performed by a new model generating unit 306 in FIG. 4. In the pruning unit 306, a neural network 305 in a pruned form after only the parameters of the second model that are important for the recognition of the second learning data set 301B are extracted is generated from the unpruned neural network 303.

In the learning processing unit 307, the neural network 305 is learned using the second learning data set 301B.

In a model evaluation unit 503, the arithmetic accuracy of the neural network 305 (second model) is evaluated using an evaluation data set 504. The neural network 305 that exhibits performance that satisfies the criteria of the evaluation data set 504 is eventually set as the second model (metric model).

In the example of processing flow of the learning processing method according to the present invention illustrated in FIG. 7, first, the learning flow is started in step S601. This process is started when an operator performs learning after items necessary for learning a lightweight model are set by the operator or the like.

Step S602 corresponds to a part of the process performed by the important parameter identification unit 304 in FIG. 6. In this process, a neural network that is an object to be learned is initialized using the unpruned network structure 303 and the pre-trained model 302 that are inputted by the operator. In this learning processing method, the unpruned network structure 303 is a network structure provided by an operator to perform image processing that is a target for learning the lightweight model. Also in this learning processing method, the initialization of the neural network to be learned is performed so as to determine initial values of parameters in the given network structure 303. A part of or the whole neural network to be learned is initialized by copying the parameters of the pre-trained model 302. In the neural network to be learned, values of parameters to which the parameters of the pre-trained model 302 have not been copied are determined using random numbers or constants set by an operator.

Such initialization of the neural network using the parameters of the pre-trained model 302 is generally referred to as transfer learning. The initialized network structure 303 has an unpruned neural network configuration, and the network structure 303 reflects parameters of the pre-trained model 302. Accordingly, it is safe to say that the initialized network structure 303 is a structure obtained by reflecting the pre-trained model 302 in a lightweight form in the network structure of an unpruned network original form.

In this learning processing method, which parameters of the neural network to be learned are copied from the pre-trained model 302 is determined by the operator. The operation of copying the parameter from the pre-trained model 302 with respect to only a part of the neural network to be learned is performed when an image processing function of an object to be learned and an image processing function of the pre-trained model differ from each other or the like. For example, when the image processing function of the object to be learned is an object detection function and the image processing function of the pre-trained model 302 is an image classification function, parameters are copied to a neural network for object detection only with respect to a part of a neural network that is referred to as a feature extractor that extracts an image feature from an input image. Even when both image processing functions are the same image classification function, parameters are copied only with respect to a part of a neural network that is referred to as a feature extractor, and a subsequent layer for predicting a classification result may be initialized by other methods.

Step S603 corresponds to a part of the important parameter identification unit 304 in FIG. 6. In this learning processing method, the degree of importance of each parameter in the neural network initialized in step S602 is evaluated using the neural network initialized in step S602 and the learning data set 301B. In this step, the evaluation of the degrees of importance is performed as described in the description with reference to FIG. 4.

Step S604 corresponds to the pruning unit (new model generating unit in FIG. 4) 306 illustrated in FIG. 6. In this step, parameters having low degrees of importance are deleted from the neural network initialized in step S602 in accordance with the degrees of importance of the respective parameters evaluated in step S603. In this step, a method of determining parameters to be deleted is selected by an operator. As such a method, a method of deleting parameters other than some percentages of parameters belonging to an upper percentage group having high degrees of importance, and a method of deleting the parameters having the degrees of importance at levels equal to or lower than a certain threshold.

Step S605 corresponds to the learning unit 307 illustrated in FIG. 6. In this step S605, the parameters of the neural network that has become lightweight and is obtained in step S604 are learned using the learning data set 301B. This step is performed by a stochastic gradient descent method or the like that is usually used for learning of a neural network.

Step S606 corresponds to the model evaluation unit 503 illustrated in FIG. 6. In this step, the performance of the neural network learned in step S605 is evaluated using the evaluation data set 504. The performance evaluation of the neural network is performed so as to evaluate the degree of performance that the obtained lightweight model 505 can achieve in image processing of a recognition target.

In step S607, the neural network learned in step S605 is outputted as the lightweight model 505. At this stage of processing, it is preferable to output the lightweight model 505 together with the recognition performance evaluated in step S606 and the time during which the recognition processing is performed.

In step S608, the learning flow ends.

As described above, in the present invention, it is possible to generate a lightweight model at the time of initialization by identifying parameters important for the recognition of the learning data set 301B and the evaluation data set 504 from the pre-trained model 302 and by transferring only the important parameters. Accordingly, it is possible to acquire the lightweight model 505 having high recognition accuracy by performing learning one time.

Embodiment 2

In a case where a plurality of pre-trained models exist, it is necessary to determine the utilization of which pre-trained model is appropriate in generating a desired lightweight model. An embodiment 2 relates to preparing materials for making such determination in advance, and providing such materials as references in an actual operation.

According to the embodiment 1 of the present invention, it is possible to evaluate how many important parameters for the learning data set 301B and the evaluation data set 504 the pre-trained model 302 holds even when learning is not performed for a long time. In a case where a plurality of learning models are prepared, a plurality of model candidates for a model used as the pre-trained model 302 exist. In general, the performance of a neural network to be learned changes depending on a model used as the pre-trained model 302. Accordingly, it is important to select an appropriate pre-trained model 302 in order to learn a lightweight model in a short period of time.

However, in the conventional method, it is not possible to determine whether each pre-trained model is good or bad unless the neural network is actually learned by the learning data set 301B and the learning unit 306, and the recognition performance is evaluated by the evaluation data set 504 and the model evaluation unit 503.

Accordingly, in a case where a plurality of candidates for the pre-trained model 302 exist, it is necessary to perform learning and evaluation on all candidates in order to select the best model as the pre-trained model 302. In such a case, the time required for learning the lightweight model 305 becomes enormous. Accordingly, the selection of one appropriate model from among a plurality of candidates for the pre-trained model 302 without performing learning becomes important in learning a highly accurate lightweight model in a short period of time.

In this embodiment, an unpruned non-lightweight model becomes an index for the recognition performance that is reachable by a neural network that is an object to be learned. Accordingly, it is necessary to learn and hold the non-lightweight model in terms of model management.

Figures 6, 8, 9:
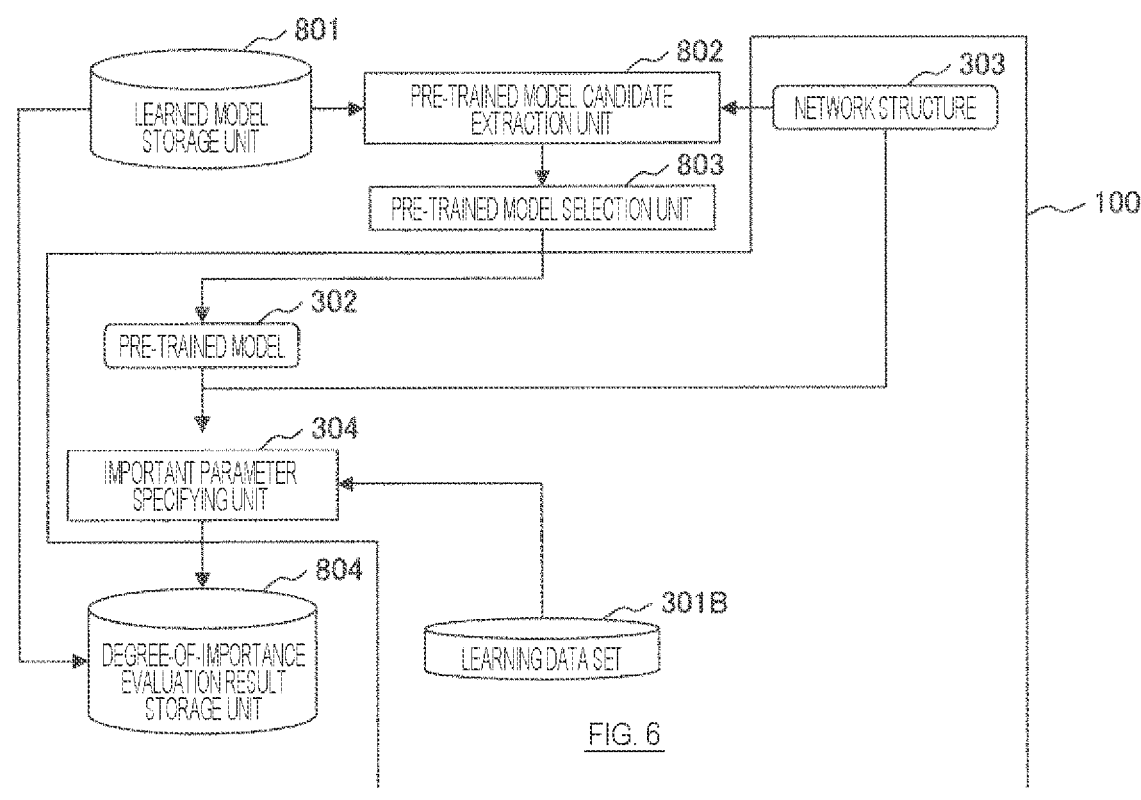
FIG. 8 is a table illustrating determination material information in a table format when an operator performs degree-of-importance evaluation on a plurality of candidates for a pre-trained model 302.
FIG. 9 is a diagram illustrating a functional configurational example of a learning processing device according to an embodiment 2 of the present invention.

In the embodiment 2 of the present invention, a degree-of-importance evaluation table 700 illustrated in FIG. 8 is generated in advance using the important parameter identification unit 304 that is a partial function of the learning processing device 100 illustrated in FIG. 6. Then, the degree-of-importance evaluation table 700 that is prepared in advance is provided as the reference for selecting an appropriate pre-trained model in an actual operation. The configuration of the device and a processing flow for preparing the degree-of-importance evaluation table 700 in advance will be described later with reference to FIG. 9 and FIG. 10.

FIG. 8 is a table illustrating an example of a degree-of-importance evaluation table with respect to a plurality of candidates for the pre-trained model 302. When the setting related to the learning data set 301B, the network structure 303, and the pruning is selected by an operator, this table is provided to the operator as determination material information for extracting pre-training candidates capable of performing transfer learning. The specific determination material information is information on the network structure of the plurality of pre-trained models, and information on the sum of degrees of importance of respective pre-trained models prepared for respective data sets used for learning the pre-trained models and the sum of degrees of importance after pruning.

In the degree-of-importance evaluation table 700 illustrated in FIG. 8, the type of pre-trained model 701 is a network type of each pre-trained model. For example, a case is considered where the recognition processing of an object to be learned is object detection. In this case, when an image classifier is used as the pre-trained model 302, only a part of a neural network that is referred to as a feature extractor is transferred. When the same object detector is used as the pre-trained model 302, a part of a neural network for object detection is also transferred in addition to the feature extractor. Accordingly, even when the network structure 303 is provided, a plurality of types of pre-trained models exist. Even in the case where only the feature extractor is transferred, a plurality of types of pre-trained models may exist depending on the number of layers, the number of parameters of the respective layers, and the like. Accordingly, hereinafter, the type 701 of the pre-trained model is clarified.

The pre-training data set 702 indicates a data set used for learning pre-trained model (corresponding to the learning data set 301A illustrated in FIG. 4). When the transfer learning is performed, in order to increase the accuracy of the neural network, it is important that the feature learned by a transfer source and the feature of the data set 301A that is an object to be learned match with each other.

The sum of degrees of importance 703 is a sum of the degrees of importance of the respective pre-trained models 302. The sum of degrees of importance 703 is the sum of the degrees of importance of the respective parameters evaluated by the learning data set 301A and the important parameter identification unit 304. The number of parameters varies depending on the pre-trained model 302. Accordingly, when the simple sum is acquired, the model having the large number of parameters is likely to have the larger sum of degrees of importance. In consideration of such a case, it is possible to use a degree-of-importance average that is obtained by dividing a degree-of-importance sum of the pre-trained model by the number of parameters of the respective pre-trained models.

The post-pruning sum of degrees of importance 704 is a sum of degrees of importance of the parameters remaining after pruning is performed using setting related to pruning that is given by an operator. In the post-pruning sum of degrees of importance 703, in the same manner as the sum of degrees of importance, a degree-of-importance average may be used.

The degree of importance is a value for evaluating an adverse influence exerted on the recognition performance when a certain parameter is deleted. Accordingly, it may be considered that the larger sum of degrees of importance 703, the larger number of parameters important for the recognition processing of the object to be learned are included.

Accordingly, by selecting a model having a large sum of degrees of importance 703 as the pre-trained model 302, it becomes easy to learn a highly accurate model. Furthermore, at the time of learning a lightweight model, a plurality of parameters are deleted by pruning. Therefore, by evaluating a post-pruning sum of degrees of importance 704, it is possible to evaluate how much the parameters remaining after pruning are important for the recognition of the learning data set 301B. Accordingly, when a model having the large post-pruning sum of degrees of importance 704 learns the lightweight model 505, a lightweight and highly accurate model can be learned. An operator can learn a lightweight and highly accurate model by checking such a table and by selecting a model in which both the sum of degrees of importance 703 and the post-pruning sum of degrees of importance 704 are large.

FIG. 9 and FIG. 10 illustrate an apparatus configuration and an example of processing flow for preparing the degree-of-importance evaluation table 700 with respect to the plurality of candidates for the pre-trained model 302 illustrated in FIG. 8.

First, a diagram of a functional configurational example of the learning processing device according to the embodiment 2 of the present invention is illustrated in FIG. 9. The learning processing device functional illustrated in FIG. 9 is obtained by adding the respective functions of a learned model storage unit 801, a pre-trained model candidate extraction unit 802, the pre-trained model selection unit 803, and a degree-of-importance evaluation result storage unit 804 to the learning processing device 100 illustrated in FIG. 6. Among them, the learned model storage unit 801 and the degree-of-importance evaluation result storage unit 804 are storage units such as a database of a computer. The learned model storage unit 801 stores, for example, information of the models (networks) 102-1, 102-2, 102-3 illustrated in FIG. 1 as a pre-trained model, and the degree-of-importance evaluation result storage unit 804 stores an evaluation result related to the important parameters that are extracted by the important parameter identification unit (pruning unit) 304 illustrated in FIG. 6. The degree-of-importance evaluation data described in FIG. 8 is also eventually accumulated and stored in the degree-of-importance evaluation result storage unit 804. The pre-trained model candidate extraction unit 802 and the pre-trained model selection unit 803 express processing and determination contents by an operator.

In a flowchart illustrated in FIG. 10, the following processes are sequentially performed using hardware resources, software resources, and the like illustrated in FIG. 9. First, in first step S901 illustrated in FIG. 10, a degree-of-importance evaluation flow with respect to a plurality of candidates for the pre-trained model 302 is started. Such process is started at a timing when the operator instructs performance.

In step S902 (corresponding to the processing in the pre-trained model candidate extraction unit 802), the candidates for the pre-trained model 302 are extracted from the learning model storage unit 801 using the network structure

303 given by the operator. The learning model storage unit 801 stores a model ID set for each model, a model name, a model network structure, a data set 301A used for learning, and reached recognition performance in association with each other. In step S902 (corresponding to the processing in the pre-trained model candidate extraction unit 802), a model including a network structure that can be transferred to the given network structure 303 is extracted from the learned model storage unit 801, and the model is outputted to the pre-trained model selection unit 803 as a pre-trained model candidate.

In step S903 (corresponding to the processing in the pre-trained model selection unit 803), one model on which the degree-of-importance evaluation is not performed is selected from among the pre-trained model candidates extracted by the pre-trained model candidate extraction unit 802, and the model is set as the pre-trained model 302.

In step S904 (corresponding to processing in the important parameter identification unit 304), a neural network to be learned is initialized using the network structure 303 given by the operator and the pre-trained model 302. This processing is performed by a method similar to the corresponding method used in step S602 illustrated in FIG. 7.

In step S905 (corresponding to the processing in the important parameter identification unit 304), the degrees of importance of respective parameters in the neural network initialized in step S904 are evaluated using the learning data set 301B. This processing is performed by a method similar to the corresponding method used in step S603 illustrated in FIG. 7.

In step S906 (corresponding to the processing in the important parameter identification unit 304), it is checked whether the number of times that the evaluations in steps S904 and S905 are performed has reached the number of times set by the operator. When the number of times that the evaluations in steps S904 and S905 are performed has reached the number of times set by the operator, the process advances to step S907. When the number of times that the evaluations in steps S904 and S905 are performed has not reached the number of times set by the operator, the processing returns to step S904 and repeats the processing until the set number of times is reached. The number of times set in the processing may be any number of times as long as the number of times is one or more. The random numbers are used at the time of initialization of the neural network performed in step S904. This processing may be performed to suppress the influence of the random numbers exerted by performing the evaluation a plurality of times.

For example, in a case where a model that is pre-trained by image classification is transferred when a neural network for object detection is learned, in general, parameters are copied only with respect to a part of a feature extractor, and initialization is performed with random numbers with respect to other parts. The first-order or second-order gradient information of the feature extractor used at the time of performing the degree-of-importance evaluation is influenced by the initialization of another neural network at a stage subsequent to the feature extractor. Accordingly, in such a case, in order to correctly evaluate the degrees of importance of respective parameters included in the feature extractor, the initialization may be performed using a random number a plurality of times, and the degree-of-importance evaluation may be performed a plurality of times. In an actual process, it is desirable that the degrees of importance calculated in step S907 from the degrees of importance evaluated a plurality of times using the statistical information be used as the degrees of importance of the respective pre-trained models.

In step S907 (corresponding to the processing in the important parameter identification unit 304), the degrees of importance of the respective parameters are calculated from the degrees of importance evaluated in steps S904, S905, and S906. In this processing, it is possible to use the results of the time at which the degree-of importance sum is the largest. It is also possible to use the average values in the respective evaluations. The use of the order at which the degree-of-importance sum is largest corresponds to the use of the evaluation value of the time when the best initial value is obtained. In this case, the initial values of the respective parameters may be stored and may be used in actual learning. Furthermore, in a case where an average of degrees of importance at respective times is used as the degree of importance, the case corresponds to a case where parameters that are minimally influenced by the random numbers are used with emphasis.

In step S908 (corresponding to the processing in the important parameter identification unit 304), the evaluation conditions that are used and the degrees of importance that are evaluated in step S907 are stored in the degree-of-importance evaluation result storage unit 804 in association with each other. The evaluation conditions used in this processing relate to information related to the pre-trained model 302, the number of times that the evaluation of the degrees of importance is performed, the method that is used for evaluating the degrees of importance in step S907, and the like. The degree-of-importance evaluation result storage unit 804 stores information on the learning data set 301B used in respective evaluations and information related to the evaluated degrees of importance, a model ID, a name, and a network structure of a model used as a pre-trained model, a data set used for pre-training, and recognition performance at the time of pre-training. In this processing, with respect to the information related to the degrees of importance, all of the degrees of importance related to the respective parameters may be stored, or the statistical information may be stored. By performing the processing in step S908, data on the sum of degrees of importance 703 and the post-pruning sum of degrees of importance 704 with respect to a focused pre-trained model candidate is added to the degree-of-importance evaluation table 700 illustrated in FIG. 8.

In step S909 (corresponding to the processing of the important parameter identification unit 304), it is checked whether the evaluation is completed with respect to all candidates for the pre-trained model extracted in step S902. When the evaluation is completed, the processing advances to step S910. When the evaluation is not completed, the processing is repeated from step S903 until the evaluation is completed.

In step S910, the degree-of-importance evaluation flow ends. After the processing for all necessary advance preparation models is completed, the data illustrated in FIG. 8 is prepared in the degree-of-importance evaluation result storage unit 804.

As has been described above, according to the present invention, by identifying only important parameters from the pre-trained model 302 at the time of performing transfer learning and by performing the learning, the lightweight model 306 can be acquired by one-time learning and hence, learning of the lightweight model 306 can be performed in a short period of time.

Furthermore, as illustrated in FIG. 8, FIG. 9, and FIG. 10, by only evaluating the degrees of importance with respect to the pre-trained model 302, it is possible to evaluate whether each pre-trained model is good or bad without performing actual learning and hence, it is possible to shorten the learning of the lightweight model 305.

Embodiment 3

An embodiment 3 corresponds to a case where the pre-trained model 302 has not learned features important for recognition processing that is an object to be learned at the time of performing transfer learning.

In the embodiment 1 of the present invention, the time required for learning the lightweight model 505 is shortened by transferring only important parameters in the recognition processing of the object to be learned at the time of performing transfer learning. However, at the time of performing transfer learning, there may be a case where the pre-trained model 302 has not learned features that are important for recognition processing of an object to be learned. In such a case, it is difficult to learn the lightweight model 505 with high accuracy only by transferring important parameters from the pre-trained model 302.

Figures 4, 11:
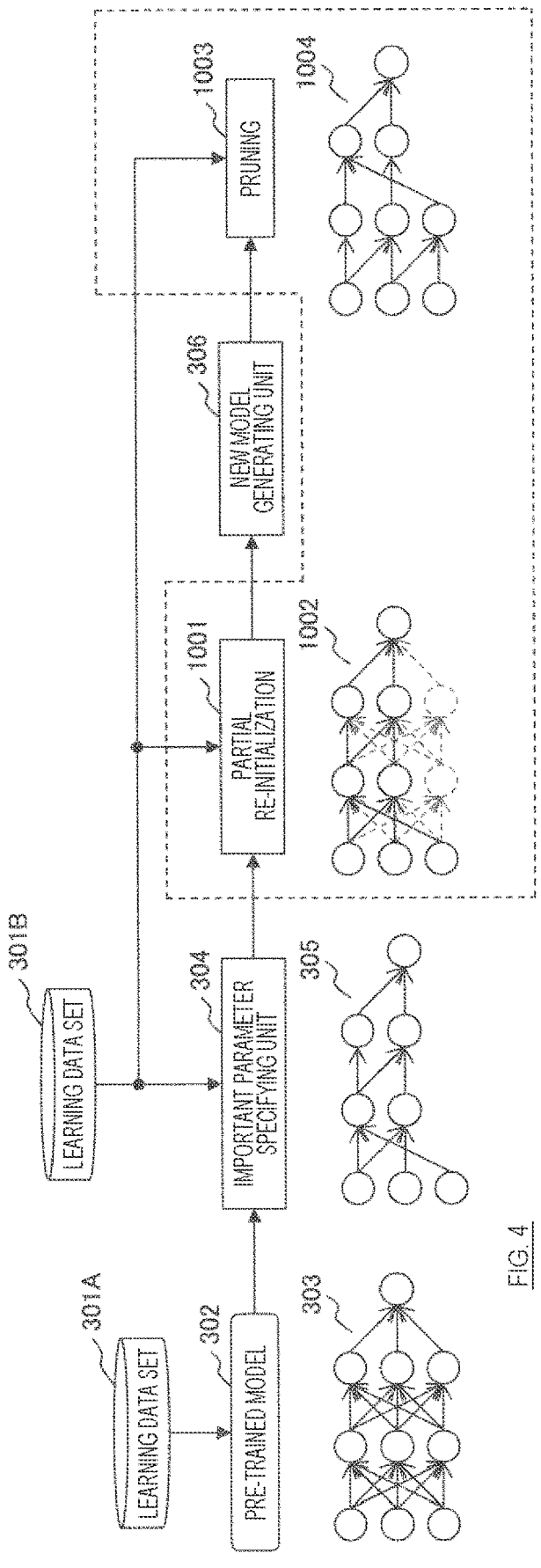
FIG. 11 is a diagram illustrating an outline of partial reinitialization processing.

FIG. 11 is a diagram illustrating partial reinitialization processing introduced to solve such a problem. FIG. 11 illustrates a flow of processing corresponding to the flow of processing illustrated in FIG. 4. The flow of processing illustrated in FIG. 11 is characterized in that the processing consisting of partial reinitialization processing 1001 and pruning processing 1003 is newly added to the processing illustrated in FIG. 4.

Such a series of pieces of processing is performed on the following premise. As has been described heretofore, the important parameter identification unit 304 identifies the important parameters and hence, the network 305 at that point of time is assumed. However, at the time of performing transfer learning, the pre-trained model 302 has not learned features important for the recognition processing of the object to be learned. Accordingly, the network 305 is insufficient. In the above-described processing, the network 305 being insufficient means that the network is excessively simplified, or necessary routes are not formed in the network.

In consideration of the above-mentioned drawback, in the partial reinitialization processing 1001, after the important parameter identification unit 304 identifies the important parameters, only the parameters to be pruned are reinitialized. As a result, when the partial reinitialization processing 1001 is applied to the neural network 305 where only the parameters having the high degrees of importance are left, the neural network 305 is reinitialized to the neural network 1002 where neurons are indicated by a broken line. This reinitialization is performed in a mode where pruning can be easily performed. That is, the reinitialization is performed such that, after learning is performed by the model generation processing unit 306, pruning can be performed in the pruning processing 1003 with least influence on accuracy. The reinitialization that enables easy pruning can be performed such that the initialization is performed while setting the respective parameters to zero. Alternatively, random numbers that can take small absolute values may be used.

Figure 12:
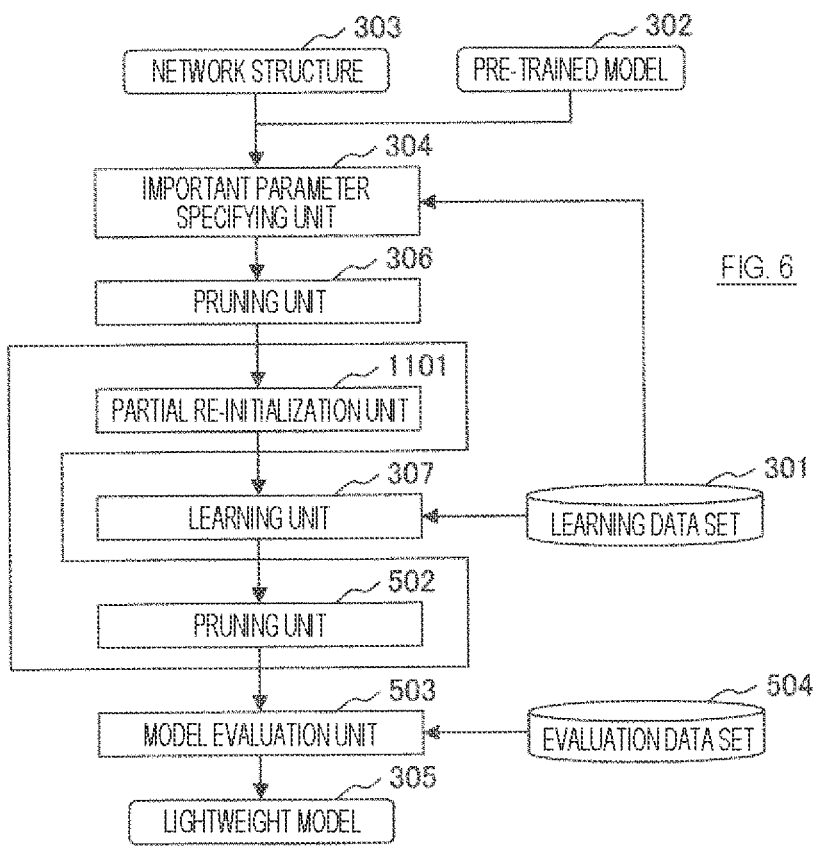
FIG. 12 is a diagram illustrating a functional constitutional example of a learning processing device according to an embodiment 3 of the present invention.

FIG. 12 is a diagram illustrating a functional configuration example of the learning processing device of the present invention including the partial reinitialization illustrated in FIG. 11. FIG. 13 is a flowchart illustrating a processing flow example of the learning processing method of the present invention including the partial reinitialization illustrated in FIG. 11. The functional configuration example illustrated in FIG. 12 is the configuration obtained by adding the partial reinitialization processing to the functional configuration example of the present invention described in FIG. 6. The processing flow example illustrated in FIG. 13 is the processing flow example obtained by adding partial reinitialization processing to the example of processing flow of the present invention illustrated in FIG. 7. Accordingly, only the differences between them will be described.

In the flowchart illustrated in FIG. 13, in step S1201, the partial reinitialization unit 1101 reinitializes the parameters that are obtained in step S604 by making the pruning unit 502 delete the parameters having low degrees of importance from the neural network initialized in step S602 corresponding to the degrees of importance that are evaluated in step S603. As described above, the reinitialization is performed with zero or random numbers having small absolute values such that pruning can be performed easily.

In step S1202, the pruning unit 502 deletes unnecessary parameters from the neural network that is learned in step S605. The reinitialization processing performed in step S1201 is performed such that pruning can be performed easily. Accordingly, the influence exerted on the accuracy can be made small.

By combining the partial reinitialization processing with the learning processing in this manner, in a case where the pre-trained model 302 has parameters important for recognition of the learning data set 301B, the transferred parameter is learned, and in a case where the pre-trained model 302 does not have the parameters important for recognition of the learning data set 301B, the neurons that are partially reinitialized are learned. In a case where all the features important for recognition of the learning data set 301B are learned by the pre-trained model 302, the neurons that are partially reinitialized can be easily pruned. The neural network may be learned again in step S605 after the pruning in step S1202.

Embodiment 4

In the embodiment 3, the description has been made with respect to the case where the parameters are re-initialized with small values in the partial reinitialization processing 1001. However, the initialization may be performed substantially in the same manner as the initialization in normal learning, and a region where pruning is performed may be obtained by a method different from a method in normal learning. In an embodiment 4 of the present invention, pruning using a mask layer is described.

Figure 14:
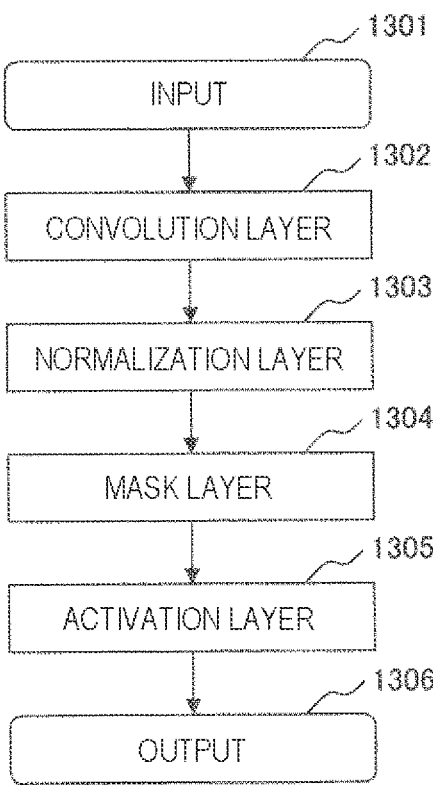
FIG. 14 is a diagram illustrating an outline of pruning using a masking layer.

FIG. 14 is a diagram illustrating a concept of pruning using a mask layer. FIG. 14 illustrates a configuration where a mask layer 1304 is applied to a convolutional neural network often used in image processing. A plurality of convolution layers 1302 are applied in a normal convolutional neural network. However, FIG. 14 illustrates a configuration when attention is paid to one convolution layer 1302. In a normal convolutional neural network, an output 1306 is obtained by applying a convolution layer 1302, a normalization layer 1303, and an activation layer 1305 to an input 1301.

When the processing and parameters in the convolution layer 1302 are denoted as f and w, the processing and parameters of the normalization layer 1303 as g and θ, the processing of the activation layer 1305 as a, the input as x, and the output as y, a series of pieces of processing in the convolution layer 1302 is expressed by a following Formula (3).

[Formula (3)]

$$y = a(g(f(x; w); \theta)) \tag{3}$$

In the Formula (3), each of the input x and the output y is a third-order tensor where an image feature has dimensions of a width, a height, and a feature channel. In general, in the case of speeding up the convolution layer 1302, it is effective to delete an arithmetic operation at a unit of feature channel. For example, in a case where the original convolution layer 1302 has one hundred twenty-eight channels, ten channels that do not exert influence on recognition performance are deleted, and one hundred and eighteen channels are outputted.

In the embodiment 4 of the present invention, such deletion of the channels is performed using the mask layer 1304. When the processing and a parameter of the mask layer 1304 are denoted as m and v, a series of pieces of processing of the convolution layer 1302 that is expressed by Formula (3) is converted into Formula (4).

[Formula (4)]

$$y = a(m(g(f(x; w); \theta); v)) \tag{4}$$

In order to delete the channels at a unit of feature channel of the convolution layer 1302, the mask layer 1304 learns the parameter v. The parameter v is a vector having the same dimension as the feature channel that takes a value of 0 or 1. In the processing m of the mask layer 1304, an input feature map is outputted as it is in a portion where the parameter v is 1, and the input feature map is outputted with values of the entire width and the entire height set to in a portion where the parameter v is 0. By enabling learning of such parameter v, the calculation of the portion where the parameter v is 0 can be deleted after learning without exerting influence on the recognition performance. That is, by setting a hidden variable obtained when the convolution layer 1302 and the normalization layer 1303 are applied as an input as h, and by setting a hidden variable obtained by applying a mask layer to the hidden variable h as h', respective components of h' are given by Formula (5).

[Formula (5)]

$$h' = m(g(f(x; w); \theta); v) = m(h; v) \tag{5}$$

In Formula (5), the hidden variable h' to which the mask layer 1304 is applied can be expressed by the hidden variable h to which the convolution layer processing 1302 and the normalization layer 1303 are applied as an input. Accordingly, the hidden variable h' can be expressed by Formula (6) where a width i, a height j, and a position k of a feature channel of the hidden variable that is a third-order tensor are variable.

[Formula (6)]

$$h'_{ijk} = v_k h_{ijk} \tag{6}$$

Here, the parameter v takes a value of 0 or 1 and hence, the parameter v can be expressed by Formula (7).

[Formula (7)]

$$v = \{0, 1\} \tag{7}$$

However, the discrete parameter v in Formula (7) that takes a value of 0 or 1 cannot be learned by a stochastic gradient method usually used for learning of a neural network. This is because a gradient does not propagate in the discrete parameter v. Accordingly, it is difficult to learn which feature channel of the parameter v should be made effective.

To solve this problem, in the embodiment 4 according to the present invention, the parameter v is further sampled from a relaxed Bernoulli distribution during learning. The relaxed Bernoulli distribution is obtained by relaxing the Bernoulli distribution, which is a discrete distribution, to a continuous distribution, and can be learned by a stochastic gradient descent method. The relaxed Bernoulli distribution is also known as Gumbel-softmax. When the relaxed Bernoulli distribution is used, continuous values having values that fall within a range from 0 to 1 such as 0.1 and 0.5 are sampled as the parameter v. The mask layer 1304 calculates and outputs products of the sampled parameter v and the entire channels corresponding to inputted feature maps. As a result, with respect to the channels that are unnecessary for the recognition during learning, the parameter v takes a value that is gradually decreased by a stochastic gradient descent method. On the other hand, with respect to the channels that are important for the recognition during learning, the parameter v takes a value that is gradually increased by a stochastic gradient descent method. The mask layer 1304 learns a logit of the relaxed Bernoulli distribution for sampling the parameter v. This logit is a parameter similar to a logit of the Bernoulli distribution. When the logit is a large value, the probability that 1 is generated is high in the Bernoulli distribution. On the other hand, the probability that a value close to 1 is generated is high in the relaxed Bernoulli distribution. At the time of performing deduction after learning is finished, by using only a feature channel where the logit of the relaxed Bernoulli distribution is larger than a predetermined value, recognition processing can be performed with a small amount of arithmetic operation without decreasing recognition accuracy. That is, the output of the mask layer 1304 is expressed by Formula (8).

[Formula (8)]

$$h'_{ijk} = v'_k h_{ijk} \tag{8}$$

Here, v' is a value sampled from the relaxed Bernoulli distribution RB having a logit 1 and a temperature t as parameters as expressed by Formula (9), and is a continuous variable between 0 and 1. In this way, the logit 1 can be learned by a stochastic gradient descent method. Accordingly, a mask can be learned at a unit of feature channel for performing pruning.

[Formula (9)]

$$v' \sim RB(1, t) \tag{9}$$

By performing learning such that the number of effective channels is equal to or less than a predetermined value in the relaxed Bernoulli distribution, the learning can be performed such that the logit becomes large only with respect to important feature channels, and the logit becomes small with respect to parameters that do not contribute to the recognition. As a result, at the end of learning, a state is brought about where learning is performed with fewer feature channels. Accordingly, a situation substantially equal to the post pruning relearning illustrated in FIG. 2 is obtained. Therefore, by using only feature channels having large logits without performing relearning, it is possible to perform pruning without decreasing recognition accuracy. Here, the learning where the number of effective channels becomes equal to or less than a predetermined value is a method where learning is performed such that logits belonging to an upper percentage group of the relaxed Bernoulli distribution that the entire neural network has become large, logits of the remaining channels become small. For example, learning is performed such that Kullback-Leibler divergence between the relaxed Bernoulli distribution and the Bernoulli distribution where generation probability of 1 is set to a high value is minimized in feature channels corresponding to the logits belonging to the upper percentage group of the relaxed Bernoulli distribution. That is, a term related to the logit is added to a loss function at the time of learning as expressed by Formula (10).

[Formula (10)]

$$L = Lr + \lambda\|\theta\|^2 + \lambda_1 KL(B(1)\|B(y_1)) \tag{10}$$

Here, the third term of Formula (10) is an amount of Kullback Leibler divergence between a Bernoulli distribution B (1) having the same logits as the relaxed Bernoulli distribution RB (1, t) and B (yl) where yl in which components corresponding to the logits belonging to an upper percentage group take large values are set as the logits.

The pruning processing performed by the mask layer 1304 may be applied singly without being combined with the important parameter identification unit.

The learning processing according to the configuration illustrated in FIG. 6 may be performed using the values of the logits of the relaxed Bernoulli distribution obtained by adding the mask layer as the degrees of importance that are evaluated by the important parameter identification unit 304. Also in this case, it is considered that the larger the values of the logits that feature channels have, the larger the influence exerted on the recognition performance of the neural network when the channels are deleted at a unit of channel becomes.

In a case where the mask layer is applied to the configuration described in the embodiment 3, when the partial reinitialization unit 1101 performs reinitialization, weighting related to the neural network is initialized using an initialization method substantially equal to an initialization method used in a normal method, and the logits of the mask layer are initialized with values smaller than normal values. As a result, with respect to the reinitialized parameters, the initialization can be performed in a mode where pruning can be performed more easily than other networks.

Embodiment 5

In the embodiment 5, the description is made with respect to a method of applying a mask layer to a neural network having a complicated network structure.

Figures 15, 16:
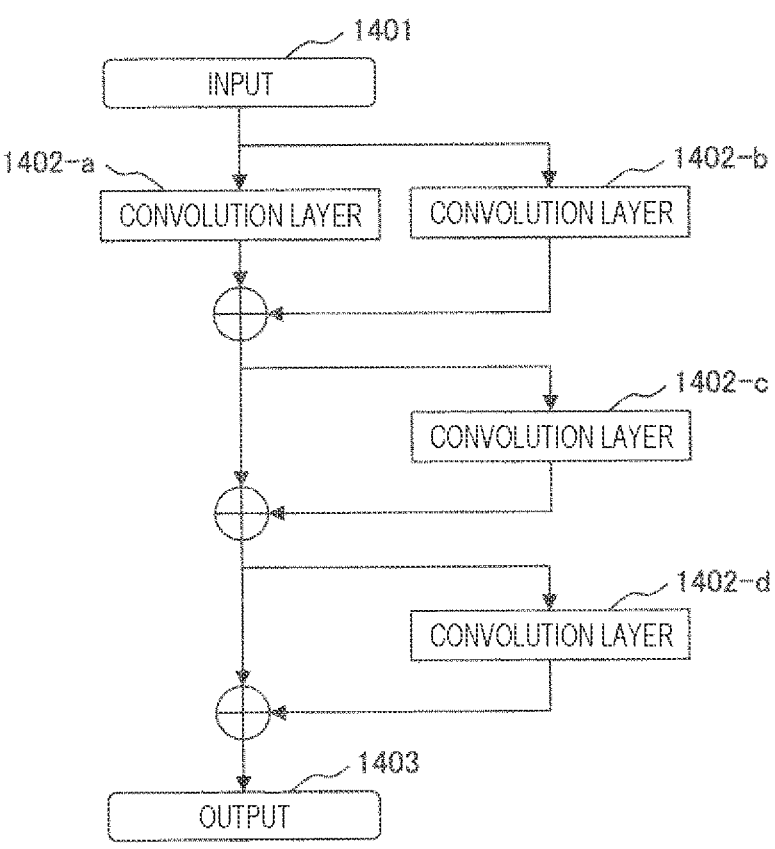
FIG. 15 is a diagram illustrating a method of applying a mask layer to a neural network having a complicated network structure.
FIG. 16 is a table illustrating a situation in which convolution layers 1402-*a* to 1402-*d* share four channels in a table format.

FIG. 15 is a diagram illustrating the method of applying a mask layer to a neural network having a complicated network structure.

In a neural network having a structure referred to as "Residual Shortcut" or "Residual connection", a plurality of convolution layers share the same feature map as illustrated in FIG. 15. For example, convolution layers 1402-*a* and 1402-*b* are applied to an input 1401 so as to form third-order tensors having the same dimension, and a sum of outputs of the convolution layers 1402-*a* and 1402-*b* is obtained. A convolution layer 1402-*c* is applied to the sum of the outputs of these two convolution layers, and the sum of the convolution layer 1402-*c* itself and two preceding convolution layers is calculated. Furthermore, the convolution layer 1402-*d* is applied, and the sum of the convolution layer 1402-*d* itself and three preceding convolution layers is calculated and a calculated value becomes an output 1403. In this embodiment, layers other than convolution layers, that is, a normalization layer, a mask layer, and an activation layer are omitted for the sake of simplicity. However, these layers may be applied in association with each convolution layer. In a case where the plurality of convolution layers 1402-*a* to 1402-*d* share the same feature map in this manner, there is a case where pruning cannot be efficiently performed.

On the other hand, FIG. 16 is a table illustrating a relationship between the degrees of effectiveness in the recognition of four channels shared by four layers consisting of convolution layers 1402-*a* to 1402-*d* shared in the neural network having the complicated network structure illustrated in FIG. 15 and the channels that can actually be pruned.

A first channel number 1404 on a first row of the table indicates the number of four feature channels of the respective convolution layers 1402-*a* to 1402-*d*. The valid feature channels 1405-*a* to 1405-*d* indicate feature channels that are made valid in the respective convolution layers 1402-*a* to 1402-*d*. Here, the feature channels that are made valid are feature channels in which the logit of the mask layer 1304 is equal to or larger than a threshold. In the valid feature channels 1405-*a* to 1405-*d*, when the logits of the corresponding channel numbers are equal to or larger than the threshold, 1 is described in the corresponding cells as the valid feature channel, and when the corresponding logits are not the valid feature channels, 0 is described in the corresponding cells. For example, in the valid feature channel 1405-*a*, the first and fourth elements of the logit of the mask layer 1304 corresponding to the channel numbers 1 and 4 are equal to or larger than the threshold. Accordingly, the valid feature channel 1405-*a* is a feature channel important for the recognition processing.

A logical sum 1406 is a logical sum of the valid feature channels 1405-*a* to 1405-*d* of the convolution layers that share the feature map. Only the channel number 3 is valid in none of the convolution layers 1402-*a* to 1402-*d* and hence, 0 is described in corresponding cells. Other channel numbers are valid feature channels in any of the convolution layers 1402-*a* to 1402-*d* and hence, 1 is described in corresponding cells. With respect to the above-mentioned case, cases exist where any one of feature channels is not valid in any one of the convolution layers. Accordingly, an arithmetic operation processing cannot be deleted only with respect to the channel that is valid in none of the shared convolution layers 1402-*a* to 1402-*d* such as the channel number 3. Accordingly, it is difficult to delete many arithmetic operations.

In a conventional pruning method, parameters to be pruned are evaluated based on values of parameters of a convolution layer and the degrees of importance of the respective parameters. Accordingly, it has been difficult to match the feature channels to be pruned among a plurality of convolution layers sharing a feature map.

The mask layer 1403 can determine a feature channel that can efficiently perform pruning even with respect to a layer having a complicated network. This is performed by allowing logits of relaxed Bernoulli distributions of the mask layers 1304 accompanying the convolution layers sharing the feature map to have the same value. This processing is performed, for example, by using the same parameter with respect to the logits of the mask layers accompanying the convolution layers 1402-*a* to 1402-*d* or by performing learning so as to reduce an amount of Kullback-Leibler divergence between the logits. Besides the above methods, an amount of Kullback-Leibler divergence with a statistical amount such as an average or a maximum value of a plurality of logits may be reduced, or an amount of Kullback-Leibler divergence with Bernoulli distribution in which a logical sum of valid feature channels indicated by a plurality of logits is regarded as the probability that the parameter v takes 1, such as the logical sum 1406 may be reduced.

Embodiment 6

Figure 17:
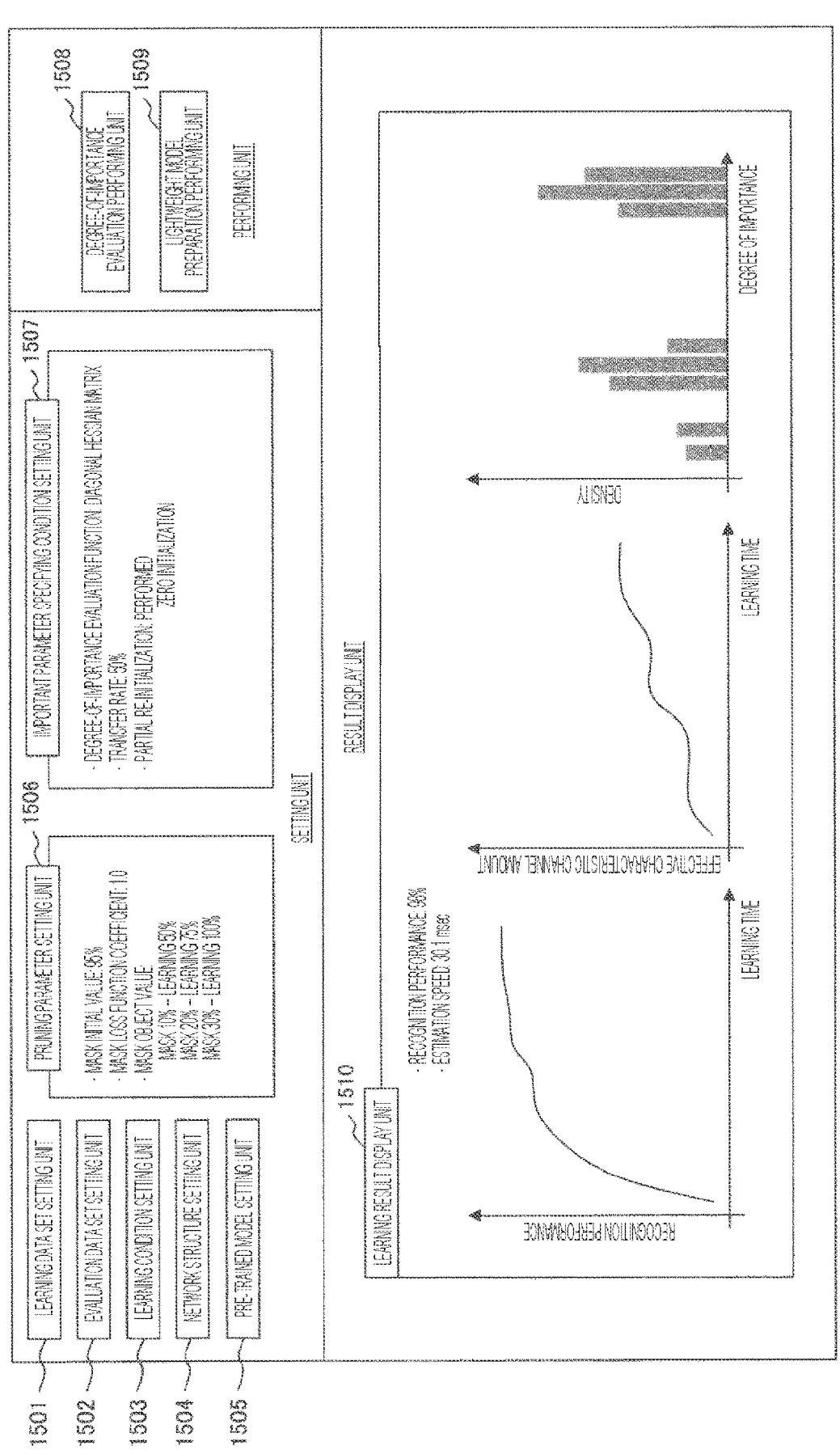
FIG. 17 is a diagram illustrating a configurational example of a monitor screen suitable for the learning processing device according to the present invention.

In the embodiment 6, the description is made with respect to a configurational example of a monitor screen suitable for the learning processing device according to the present invention. FIG. 17 is a diagram illustrating a configuration of a screen for performing learning of a lightweight model. The screen configurational example illustrated in FIG. 17 includes various setting units, execution units, and result display units. The various setting units include setting factors 1501 to 1507.

Among the setting units, the learning data set setting unit 1501 is a region where setting related to the learning data set 301B is performed. Here, data is read by designating a storage region that is stored in a predetermined format. The evaluation data set setting unit 1502 is a region where setting related to the evaluation data set 504 is performed. Here, the setting substantially equal to the setting performed in the learning data set setting unit 1501 is performed. The learning condition setting unit 1503 is a region where conditions when the learning unit (new model generating unit) 306 learns a neural network are set. The conditions relate to, for example, the number of times that parameters are updated at the time of learning, a learning rate schedule, a coefficient of weight decay, and coefficients of various loss functions.

The network structure setting unit 1504 is a region where setting relating to the network structure 303 to be learned is performed. Here, an operator selects the appropriate network structure 303 in response to the recognition processing of an object to be learned. The pre-trained model setting unit 1505 is a region where the pre-trained model 302A is set. Here, the operator selects or designates one pre-trained model.

The pruning parameter setting unit 1506 is a region where parameters related to pruning are set. In the case of performing the pruning using the mask layer 1304, an initial value of a logit of a relaxed Bernoulli distribution, an initial value of the mask probability for determining the logit, coefficients of a loss function related to the mask layer 1304, and the like are set. In general, in learning a neural network, at an initial stage, primitive image features such as edges and curves are learned, and complex features important for improving recognition performance are gradually learned. Accordingly, in a case where a loss function related to the mask layer is strongly set from the beginning of learning or in a case where many feature channels are set to be not valid from the beginning of learning, there may be a case where it is difficult to perform learning. Accordingly, at an initial stage of learning, coefficients of a loss function of a mask may be set to extremely small values. Alternatively, it may be possible to gradually relax a mask target value that determines the number of logits belonging to an upper percentage group of the mask layer 1304 that are allowed to be valid as the learning progresses. For example, the learning may be performed such that a coefficient of a mask loss function is set to 0 in the initial 30% of the learning. Alternatively, the learning may be performed such that only 10% of the feature channels of the entire network is valid in the initial 50% of the learning, the feature channel of up to 20% is valid until the progress of the learning reaches 75%, and the feature channel of 30% is valid until the end of the learning comes.

The important parameter identifying condition setting unit 1507 is a region where setting related to the processing conditions of the important parameter identification unit 304 is performed. Here, for example, the conditions including the following conditions are set. That is, the conditions are: a matrix product of a Hessian and parameters, an element product of a diagonal component of the Hessian and parameter vectors, an absolute value of an element product of gradient information and a parameter vector as an evaluation function of the degrees of importance; the use of K-FAC as a substitute for the Hessian; and the use of a mask layer. Further, a ratio of parameters to be transferred, the presence or absence of execution of partial reinitialization, and the execution method are set.

Next, the execution unit is formed of: a degree-of-importance evaluation execution unit 1508; and a learning result display unit 1510. Here, when the degree-of-importance evaluation execution unit 1508 is selected by an operator, the important parameter identification unit 304 is operated and performs the evaluation of the degrees of importance of the respective parameters of the set pre-trained model 302. When a lightweight model creation execution unit 1509 is selected by an operator, the learning unit 306 is operated and starts the learning flow from step S604 in accordance with the set conditions.

The learning result display unit 1510 is a region where information related to the learning result is displayed. Here, the learning result display unit 1510 displays, for example, changes in the recognition performance and the number of effective feature channels with respect to the achieved recognition performance, the time required for deduction of the obtained lightweight model, and the learning time. At a point of time that the degree-of-importance evaluation execution unit 1508 is selected and the evaluation is completed, a histogram of the degrees of importance may be displayed.

The operator adjusts the respective parameters until the desired recognition performance and a desired deduction speed are acquired using this information.

Figure 18:
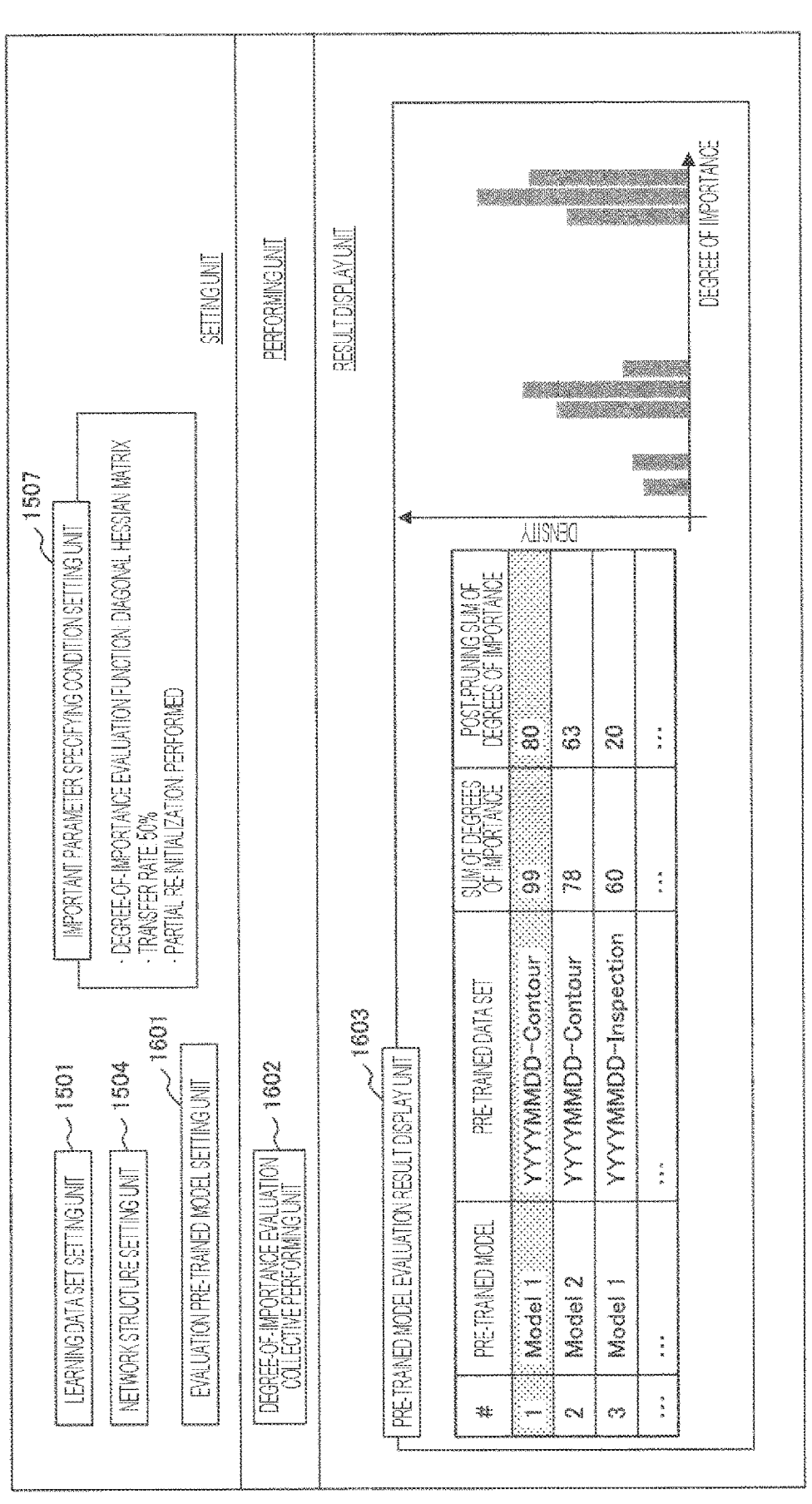
FIG. 18 is a diagram illustrating a configurational example of a screen for performing a degree-of-importance evaluation with respect to a plurality of candidates for a pre-trained model.

FIG. 18 is a diagram illustrating a configuration of a screen for performing the degree-of-importance evaluation with respect to a plurality of candidates for a pre-trained model. Also in this case, the screen is formed of a setting unit, an execution unit, and a result display unit.

The operator determines a pre-trained model to be used for learning the lightweight model 505 illustrated in FIG. 17 using this screen. A learning data set setting unit 1501, a network structure setting unit 1504, and an important parameter identifying condition setting unit 1507 are substantially equal to the corresponding units illustrated in FIG. 17.

An evaluation pre-trained model setting unit 1601 sets the pre-trained model whose degree of importance is evaluated. In FIG. 8 and FIG. 9, the description has been made with respect to an example where all candidates for the pre-trained model that are extracted by the pre-trained model candidate extraction unit 802 are evaluated. However, in order to shorten the evaluation time, the operator may select the model to which the degree-of-importance evaluation is performed by the evaluation pre-trained model setting unit 1601. Here, the pre-trained model that the pre-trained model candidate extraction unit 802 extracts may be provided to the user.

When a degree-of-importance evaluation collective execution unit 1602 is selected by the operator, the processing is started from step S903 of the degree-of-importance evaluation flow illustrated in FIG. 10.

A pre-trained model evaluation result display unit 1603 displays evaluation results of the respective pre-trained models. Here, the description has been made with respect to the example where the table illustrated in FIG. and the histogram of the degrees of importance of the selected pre-trained models are displayed.

According to the present invention that adopts the above-described screen configuration, it is possible to efficiently learn the lightweight model 505.

The present invention is not limited to the above-described embodiments, and includes various modifications of these embodiments. For example, the above-described embodiments have been described in detail for facilitating the understanding of the present invention. However, the embodiments are not necessarily limited to the learning processing device that includes all configurations described above. A part of the configuration of one embodiment can be replaced with the configuration of another embodiment, and the configuration of another embodiment can be added to the configuration of one embodiment. Further, with respect to parts of the configurations of the respective embodiments, the addition, the deletion and the replacement of other configurations can be made.

REFERENCE SIGNS LIST

101 input image
102 (102-1, 102-2, 102-3, 102-4) image processing unit (learning model)
103 (103-1, 103-2, 103-3, 103-4) processing result unit
102' (102-1, 102'-2, 102'-3) Image processing unit (environmentally different model)
103' (103'-1, 103'-2, 103'-3) processing result unit
201 learning processing in conventional pruning
202 pruning processing in conventional pruning
203 relearning processing in conventional pruning
204 configurational example of neural network by conventional pruning
301 (301A, 301B) learning data set
302 pre-trained model
303 unpruned neural network
304 important parameter identification unit
305 neural network formed using extracted important parameters
306 new model generating unit
307 learning processing
401, 402 learning curve
503 model evaluation unit 504 evaluation data set
700 degree-of-importance evaluation table
701 type of pre-trained model
702 pre-trained data set
703 sum of degrees of importance
704 post-pruning sum of degrees of importance
801 learned model storage unit
802 pre-trained model candidate extraction unit
803 pre-trained model selection unit
804 degree-of-importance evaluation result storage unit
1001 partial reinitialization processing unit
1002 partially reinitialized neural network
1003 pruning processing unit
1004 pruned neural network
1301 inputting to convolution layer
1302 convolution layer
1303 normalization layer
1304 mask layer
1305 activation layer
1306 outputting of a series of convolution layers
1401 inputting to neural network having complicated network structure
1402-$a$ to $d$ plurality of convolution layers in neural network having complicated network structure
1403 outputting to neural network having complicated network structure

The invention claimed is:

1. A learning processing device for obtaining a new second learning model from an existing first learning model, the learning processing device comprising:

a central processing unit (CPU) configured to execute:

an input unit configured to acquire a first learning model generated in advance by learning a first learning data set, and an unpruned neural network;

an important parameter identification unit configured to initialize the neural network that is an object to be learned using the first learning model and the neural network, and to identify degrees of importance of parameters in recognition processing of the initialized neural network by using a second learning data set and the initialized neural network;

a new model generating unit that configured to generate a second neural network by performing pruning processing for deleting unimportant parameters from the initialized neural network using the degrees of importance of the parameters;

a learning unit configured to learn the second neural network using the second learning data set; and an output unit configured to output the second neural network after learning as a second learning model, wherein the degrees of importance include a sum of degrees of importance and a post-pruning sum of degrees of importance.

2. The learning processing device according to claim 1, further comprising:

a display unit, coupled to the CPU, wherein the CPU is configured to:

obtain the degree of importance of the parameter obtained by the important parameter identification unit for each of the plurality of the first learning models, store the degree of importance together with the type of the first learning model, and to display, on the display unit, the degree of importance as degree-of-importance information.

3. The learning processing device according to claim 1, wherein the CPU is configured to execute:

a partial reinitialization unit configured to partially reinitialize the parameter to be pruned when the first learning model has not been able to learn a feature important for recognition processing of an object to be learned with respect to a degree of importance given by the important parameter identification unit, and wherein processing of the new model generating unit is performed after the partial reinitialization.

4. The learning processing device according to claim 1, wherein the neural network is a convolutional neural network, and wherein the CPU is configured to:

determine whether to use a feature channel of an output of a convolution layer for recognition in a some or all of the convolution layers included in the convolutional neural network is learned by relaxed Bernoulli distribution.

5. The learning processing device according to claim 4, wherein an amount of the feature channel used for recognition during learning of the relaxed Bernoulli distribution is gradually increased during the learning.

6. The learning processing device according to claim 5, wherein an evaluation of the degree of importance is obtained by an amount obtained from first-order or second-order differential information related to a parameter of the neural network of a loss function and the parameter of the neural network, or a parameter of the relaxed Bernoulli distribution.

7. The learning processing device according to claim 6, wherein in initializing a portion of the network structure that is not initialized by the parameter of the first learning model, the portion is initialized so that the parameter is easily pruned.

8. A learning processing method for obtaining a new second learning model from an existing first learning model, the learning processing method comprising:

acquiring a first learning model generated in advance by learning a first learning data set, and an unpruned neural network;

initializing the neural network that is an object to be learned using the first learning model and the neural network;

identifying degrees of importance of parameters in recognition processing of the initialized neural network by using a second learning data set and the initialized neural network;

generating a second neural network by performing pruning processing for deleting unimportant parameters from the initialized neural network using the degrees of importance of the parameters;

learning the second neural network using the second learning data set;

and setting the second neural network after learning as a second learning model, wherein the degrees of importance include a sum of degrees of importance and a post-pruning sum of degrees of importance.

* * * * *